(12) United States Patent
Nakamaru

(10) Patent No.: US 10,389,932 B2
(45) Date of Patent: Aug. 20, 2019

(54) IMAGING APPARATUS AND IMAGING METHOD

(71) Applicant: FUJIFILM Corporation, Tokyo (JP)

(72) Inventor: Fumio Nakamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/920,463

(22) Filed: Mar. 14, 2018

(65) Prior Publication Data

US 2018/0205875 A1    Jul. 19, 2018

Related U.S. Application Data

(63) Continuation of application No. PCT/JP2016/073842, filed on Aug. 15, 2016.

(30) Foreign Application Priority Data

Sep. 30, 2015    (JP) ................ 2015-193023

(51) Int. Cl.
*H04N 5/232*    (2006.01)
*G02B 7/28*    (2006.01)
(Continued)

(52) U.S. Cl.
CPC ........... *H04N 5/23212* (2013.01); *G02B 7/28* (2013.01); *G02B 7/34* (2013.01); *G03B 13/30* (2013.01);
(Continued)

(58) Field of Classification Search
CPC . G02B 7/28; G02B 7/34; G03B 13/36; G03B 15/00; G03B 17/18; G06T 7/194;
(Continued)

(56) References Cited

U.S. PATENT DOCUMENTS 5,479,234 A * 12/1995 Kitaoka .................. G02B 7/28
                                                                396/103
2005/0117033 A1    6/2005 Matsui
(Continued)

FOREIGN PATENT DOCUMENTS

JP    H06337346    12/1994
JP    2000083246    3/2000
(Continued)

OTHER PUBLICATIONS

"International Search Report (Form PCT/ISA/210) of PCT/JP2016/073842," dated Nov. 8, 2016, with English translation thereof, pp. 1-5.
(Continued)

*Primary Examiner* — Amy R Hsu
(74) *Attorney, Agent, or Firm* — JCIPRNET

(57) ABSTRACT

Provided are an imaging apparatus and an imaging method capable of relatively accurately focusing on a main object in a relatively short time. A movement region (40) of a main object OA is imaged in a camera apparatus A and a different camera apparatus B. In the camera apparatus A, the main object OA is recognized from a captured image. Data indicating the position of the main object OA, transmitted from the camera apparatus B, is received in the camera apparatus A, and a focusing target range is set at the front and back of the position of the main object OA. A movement of a focus lens of the camera apparatus A is limited so as to focus on the focusing target range.

21 Claims, 21 Drawing Sheets

(51) Int. Cl.
*G02B 7/34* (2006.01)
*G03B 13/36* (2006.01)
*G06T 7/80* (2017.01)
*G06T 7/194* (2017.01)
*G06T 7/50* (2017.01)
*G03B 13/30* (2006.01)

(52) U.S. Cl.
CPC .............. *G03B 13/36* (2013.01); *G06T 7/194* (2017.01); *G06T 7/50* (2017.01); *G06T 7/80* (2017.01); *H04N 5/232* (2013.01); *H04N 5/23219* (2013.01); *H04N 5/23296* (2013.01); *H04N 5/232127* (2018.08); *H04N 5/232945* (2018.08); *G03B 2206/00* (2013.01)

(58) Field of Classification Search
CPC . G06T 7/50; G06T 7/80; H04N 5/232; H04N 5/23212; H04N 5/23296
See application file for complete search history.

(56) References Cited

U.S. PATENT DOCUMENTS

| | | | | |
|---|---|---|---|---|
| 2005/0270410 | A1* | 12/2005 | Takayama | H04N 5/23212 348/345 |
| 2007/0286590 | A1* | 12/2007 | Terashima | G03B 3/00 396/125 |
| 2010/0201864 | A1 | 8/2010 | Takayama | |
| 2014/0139724 | A1* | 5/2014 | Yasuda | H04N 5/23212 348/349 |
| 2014/0267869 | A1* | 9/2014 | Sawa | H04N 5/23293 348/333.03 |
| 2014/0307150 | A1* | 10/2014 | Sakamoto | H04N 5/23212 348/349 |

FOREIGN PATENT DOCUMENTS

| | | |
|---|---|---|
| JP | 2005167517 | 6/2005 |
| JP | 2006018246 | 1/2006 |
| JP | 2007328212 | 12/2007 |
| JP | 2009008842 | 1/2009 |
| JP | 2010093422 | 4/2010 |
| JP | 2011075735 | 4/2011 |
| JP | 2013213903 | 10/2013 |
| JP | 5472506 | 4/2014 |
| JP | 2014102293 | 6/2014 |
| JP | 2014178643 | 9/2014 |
| JP | 2014206583 | 10/2014 |

OTHER PUBLICATIONS

"Written Opinion of the International Searching Authority (Form PCT/ISA/237) of PCT/JP2016/073842," dated Nov. 8, 2016, with English translation thereof, pp. 1-16.

Office Action of Japan Counterpart Application, with English translation thereof, dated Sep. 25, 2018, pp. 1-5.

* cited by examiner

FIG. 28

FOCAL DISTANCE 100 mm

| SIZE OF FACE | HEIGHT | OBJECT DISTANCE |
|---|---|---|
| 25 PIXELS | 150 PIXELS | 40 m |
| 50 PIXELS | 300 PIXELS | 20 m |
| 100 PIXELS | 600 PIXELS | 10 m |
| 200 PIXELS | 1200 PIXELS | 5 m |

FIG. 29

FOCAL DISTANCE 400 mm

| SIZE OF FACE | HEIGHT | OBJECT DISTANCE |
|---|---|---|
| 25 PIXELS | 150 PIXELS | 160 m |
| 50 PIXELS | 300 PIXELS | 80 m |
| 100 PIXELS | 600 PIXELS | 40 m |
| 200 PIXELS | 1200 PIXELS | 20 m |

IMAGING APPARATUS AND IMAGING METHOD

CROSS-REFERENCE TO RELATED APPLICATIONS

This application is a Continuation of PCT International Application No. PCT/JP2016/073842 filed on Aug. 15, 2016, which claims priority under 35 U.S.C § 119(a) to Japanese Patent Application No. 2015-193023 filed on Sep. 30, 2015. Each of the above application(s) is hereby expressly incorporated by reference, in its entirety, into the present application.

BACKGROUND OF THE INVENTION

1. Field of the Invention

The present invention relates to an imaging apparatus and an imaging method.

2. Description of the Related Art

In a case where imaging is performed using an autofocus camera (including a cellular phone or a smartphone with a camera function), an auto focus area is set, and then, a main object is positioned in the set area. Further, an imaging method suitable for a case where a plurality of moving objects is imaged, such as a case where sports players or the like are imaged (Japanese Patent No. 5472506), or a camera control system that images an object using a plurality of cameras (JP2000-83246A) may also be considered, for example. Further, there is a method for focusing on a designated object using a focus instruction device provided outside an imaging apparatus with high accuracy (JP2014-206583A), a method for focusing on an object during imaging for a motion picture at high speed (JP2011-75735A), a method for accurately focusing on an object even in a situation where an object is not easily visualized (JP2009-8842A), a method for reducing a focusing time (JP2013-213903A), or the like.

SUMMARY OF THE INVENTION

In simply focusing on an object in an auto focus area, in a case where a main object is outside the auto focus area, focusing is performed on an object other than the main object. In the techniques disclosed in Japanese Patent No. 5472506, JP2000-83246A, and JP2011-75735A, in a case where a main object is outside an auto focus area, or in a case where the main object becomes a shade of a different object, focusing is performed on the different object. Even though focusing is performed on the main object, the focusing cannot be immediately performed. Further, in the technique disclosed in JP2014-206583A, an object is specified on an image for focusing, but it may take time for the focusing. In addition, in the technique disclosed in JP2009-8842A, a distance to an object is calculated, and focusing is performed on the basis of the distance, but it may take time for the focusing. Furthermore, the technique disclosed in JP2013-213903A does not relate to a method for detecting the position of the main object.

An object of the invention is to provide an imaging apparatus and an imaging method for relatively accurately focusing on a main object in a relatively short time.

According to a first aspect of the invention, there is provided an imaging apparatus comprising: a position specification information acquisition unit that acquires position specification information for specifying the position of a main object in a real space; an imaging unit that images an imaging range to obtain a captured image; a main object recognition unit that recognizes the main object in the captured image obtained by the imaging unit; a focusing control unit that sets a range defined at the front and back of the position specified by the position specification information acquired in the position specification information acquisition unit as a focusing target range in which imaging is performed in a state of focusing on an object that is present within the range to limit a movement of a focus lens; a focus unit that drives the focus lens under the control of the focusing control unit; and an imaging control unit that focuses a main object image of the main object recognized by the main object recognition on a light receiving surface using the focus lens driven by the focus unit to cause the imaging unit to perform imaging; wherein in a case where the main object is imaged by a first position detection imaging apparatus, first distance data indicating a distance from the first position detection imaging apparatus to the main object and first angle data indicating an angle formed by the first position detection imaging apparatus and the main object are transmitted by the first position detection imaging apparatus; and the position specification information acquisition unit includes a first reception unit that receives the first distance data and the first angle data transmitted by the first position detection imaging apparatus, and a first calculation unit that calculates position information for specifying the position of the main object on the basis of the first distance data and the first angle data received by the first reception unit.

According to the first aspect of the invention, there is also provided an imaging method. That is, the method comprises: acquiring position specification information for specifying the position of a main object in a real space, using a position specification information acquisition unit; imaging an imaging range to obtain a captured image, using an imaging unit; recognizing the main object from the captured image obtained by the imaging unit, using a main object recognition unit; setting a range defined at the front and back of the position specified by the position specification information acquired in the position specification information acquisition unit as a focusing target range in which imaging is performed in a state of focusing on an object that is present within the range to limit a movement of a focus lens, using a focusing control unit; driving the focus lens under the control of the focusing control unit, using a focus unit; and focusing a main object image of the main object recognized by the main object recognition unit on a light receiving surface using the focus lens driven by the focus unit to cause the imaging unit to perform imaging, using an imaging control unit; transmitting by a first position detection imaging apparatus, in a case where the main object is imaged by the first position detection imaging apparatus, first distance data indicating a distance from the first position detection imaging apparatus to the main object and first angle data indicating an angle formed by the first position detection imaging apparatus and the main object; receiving, by a first reception unit of the position specification information acquisition unit, the first distance data and the first angle data transmitted by the first position detection imaging apparatus; and calculating, by a first calculating unit of the position specification information acquisition unit, position information for specifying the position of the main object on the basis of the first distance data and the first angle data received by the first reception unit.

It is preferable that the focusing target range becomes wider as an object depth of field of the imaging unit becomes deeper.

The imaging apparatus may further comprise a detection unit that detects the amount of movement of the main object. In this case, for example, in a case where the amount of movement detected by the detection unit is equal to or greater than a threshold value, the focusing target range is widened.

In a case where the main object is imaged by a second position detection imaging apparatus, second distance data indicating a distance from the second position detection imaging apparatus to the main object and second angle data indicating an angle formed by the second position detection imaging apparatus and the main object are transmitted by the second position detection imaging apparatus, the first reception unit receives, for example, the first distance data and the first angle data transmitted by the first position detection imaging apparatus and the second distance data and the second angle data transmitted by the second position detection imaging apparatus, and the first calculation unit calculates, for example, the position specification information for specifying the position of the main object on the basis of at least one of a set of the first distance data and the first angle data received by the first reception unit or a set of the second distance data and the second angle data received by the first reception unit.

It is preferable that in a case where the position of the main object is detected by a position detection device and the position specification information indicating the position of the main object is transmitted by the position detection device, the position specification information acquisition unit includes, for example, second reception unit that receives the position specification information transmitted by the position detection device.

The focus unit may set, for example, in a case where the main object is recognized by the main object recognition unit, an AF area including the recognized main object, may set a predetermined area as the AF area in a case where the main object is not recognized by the main object recognition unit, and may drive the focus lens to focus on an object that is present in the set AF area.

The focus unit may set, for example, in a case where the main object is recognized by the main object recognition unit, an AF area including the recognized main object, may set an AF area on the basis of a position specified by the position specification information acquired in the position specification information acquisition unit in a case where the main object is not recognized by the main object recognition unit, and may drive the focus lens to focus on an object that is present in the set AF area.

It is preferable that a distance to the main object is calculated on the basis of a phase difference of the main object imaged by the first position detection imaging apparatus.

The imaging apparatus may further comprise: AF command input unit that inputs an AF command; and a main object determination unit that determines an object included in an AF area defined in the captured image obtained by the imaging unit as the main object as the AF command is input through the AF command input unit. In this case, the position specification information acquisition unit may acquire, for example, the position specification information for specifying the position of the main object determined by the main object determination unit in the real space.

The imaging apparatus may further comprise: a display device that displays the captured image obtained by the imaging unit on a display screen; a distance calculation unit that calculates a distance to the main object; and a display control unit that displays the distance calculated by the distance calculation unit on the display screen in association with the main object.

The position specification information acquired in the position specification information acquisition unit specifies, for example, the position of each of the main object and a sub-object in the real space. In this case, the imaging apparatus may further comprise a sub-object recognition unit that recognizes a sub-object from the captured image obtained by the imaging unit. Further, the distance calculation unit calculates, for example, a distance to the main object or a distance to the sub-object, and the display control unit displays, for example, the distance calculated by the distance calculation unit on the display screen in association with the main object or the sub-object corresponding to the distance.

The imaging apparatus may further comprise: a remaining distance calculation unit that calculates a remaining distance between the distance to the main object calculated by the distance calculation unit and a distance to a position that is focused by the focus lens. In this case, it is preferable that the display control unit displays, for example, the remaining distance calculated by the remaining distance calculation unit on the display screen in association with the main object.

The position specification information acquired in the position specification information acquisition unit specifies the position of each of the main object and a sub-object in the real space, for example. In this case, the imaging apparatus may further comprise a sub-object recognition unit that recognizes a sub-object from the captured image obtained by the imaging unit. The distance calculation unit calculates a distance to the main object and a distance to the sub-object. Further, the imaging apparatus may further comprise a remaining distance calculation unit that calculates a remaining distance between the distance to the main object calculated by the distance calculation unit and a distance to a position that is focused by the focus lens and a remaining distance between the distance to the sub-object calculated by the distance calculation unit and a distance to a position that is focused by the focus lens. Further, it is preferable that the display control unit displays the remaining distance calculated by the remaining distance calculation unit on the display screen in association with the main object or the sub-object corresponding to the remaining distance.

The imaging apparatus may further comprise: a position calculation unit that calculates the position, in the real space, of the main object recognized by the main object recognition unit; a mismatch determination unit that determines whether there is mismatching between the position calculated by the position calculation unit and the position, in the real space, of the main object specified by the position specification information acquired by the position specification information acquisition unit; and a recognition control unit that performs the recognition of the main object in the main object recognition unit again in a case where it is determined by the mismatch determination unit that there is mismatching.

The position specification information acquisition unit acquires a plurality of pieces of position specification information, for example. In this case, the imaging apparatus may further comprise a reliability calculation unit that calculates a reliability of the recognition of the main object performed by the recognition control unit on the basis of a plurality of positions, in the real space, of the main object specified by the plurality of pieces of position specification information and positions calculated by the position calculation unit. Further, it is preferable that the focus unit drives the focus lens while limiting the movement thereof in a case where the reliability calculated by the reliability calculation unit is equal to or greater than a threshold value.

The imaging apparatus may further comprise: a sub-object recognition unit that recognizes a sub-object from the captured image obtained by the imaging unit; and a position calculation unit that calculates the positions, in the real space, of the main object recognized by the main object recognition unit and the sub-object recognized by the sub-object recognition unit. The position specification information acquired by the position specification information acquisition unit specifies, for example, the position, in the real space, of each of the main object and the sub-object. In this case, the imaging apparatus may further comprise: a mismatch determination unit that determines whether there is mismatching between the positions calculated by the position calculation unit and the positions represented by the position specification information acquired by the position specification information acquisition unit; and a recognition control unit that performs the recognition process in at least one of the main object recognition unit or the sub-object recognition unit again with respect to at least one of the main object or the sub-object present at a position for which it is determined by the mismatch determination unit that there is the mismatching.

The position specification information acquisition unit receives, for example, position specification information transmitted from a position detection device provided in the main object.

It is preferable that the distance to the main object is calculated from the size of the main object imaged by the first position detection imaging apparatus or the size of the face of the main object and a focal distance of the first position detection imaging apparatus.

There may be provided an imaging apparatus comprising: a position specification information acquisition unit that acquires position specification information for specifying the position of a main object in a real space; an imaging unit that images an imaging range to obtain a captured image; a stop control unit that controls a stop into such a stop value that the main object that is present at the position specified by the position specification information acquisition unit is included in an object depth of field of the imaging unit; and an imaging control unit that causes the imaging unit to image the main object using the stop control by the stop control unit.

Moreover, there may be also provided an imaging method. That is, the method comprises: acquiring position specification information for specifying the position of a main object in a real space, using a position specification information acquisition unit; imaging an imaging range to obtain a captured image, using an imaging unit; controlling a stop into such a stop value that the main object that is present at the position specified by the position specification information acquisition unit is included in an object depth of field, using a stop control unit; and causing the imaging unit to image the main object using the stop control by the stop control unit, using an imaging control unit.

The imaging apparatus may further comprise: a main object recognition unit that recognizes the main object in the captured image obtained by the imaging unit; a focusing control unit that sets a range defined at the front and back of the position specified by the position specification information acquired in the position specification information acquisition unit as a focusing target range in which imaging is performed in a state of focusing on an object that is present within the range to limit a movement of a focus lens; and a focus unit that drives the focus lens under the control of the focusing control unit. In this case, it is preferable that the imaging control unit focuses a main object image of the main object recognized by the main object recognition unit on a light receiving surface using the focus lens driven by the focus unit to cause the imaging unit to perform imaging using the stop control by the stop control unit.

According to the first aspect of the invention, position specification information for specifying the position of a main object in real space is acquired. A range defined at the front and back of the position specified by the acquired position specification information is set as a focusing target range in which imaging is performed in a state of focusing on an object that is present within the range to limit a movement of a focus lens. An imaging range is imaged, the main object in an obtained captured image is recognized, and a main object image of the recognized main object is focused on a light receiving surface by the focus lens. Since the position of the main object in real space is specified, it is possible to relatively simply focus on the main object. Further, since the movement of the focus lens is limited so that the imaging is performed in the state of focusing on the object that is present in the focusing target range defined at the front and back of the position specified by the position specification information, it is possible to focus on the main object to obtain a focused main object image in a relatively short time.

BRIEF DESCRIPTION OF THE DRAWINGS

FIG. 28 is a table showing a relationship between a face size, a height, and an object distance.

FIG. 29 is a table showing a relationship between a face size, a height, and an object distance.

DESCRIPTION OF THE PREFERRED EMBODIMENTS

Figure 1:
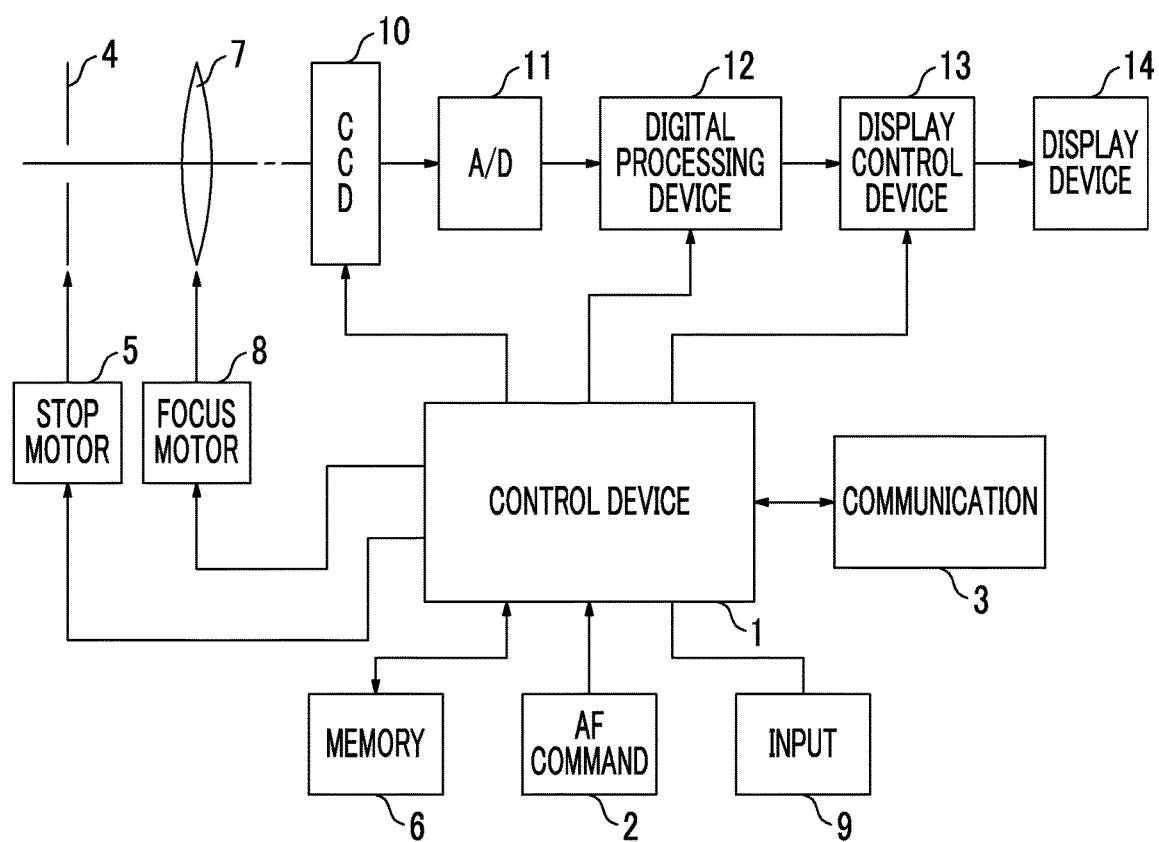
FIG. 1 is a block diagram showing an electric configuration of a camera apparatus.

FIG. 1 shows an embodiment of the invention, which is a block diagram showing an electric configuration of a camera apparatus.

An overall configuration of the camera apparatus is controlled by a control device 1.

A stop 4 that is controlled by a stop motor 5 is included in the camera apparatus. The stop motor 5 is controlled by the control device 1. Further, a focus lens 7 that is controlled by a focus motor 8 is included in the camera apparatus. The focus motor 8 is also controlled by the control device 1.

In a case where an object is imaged, an object image is formed on a light receiving surface of a charge coupled device (CCD) 10 through the focus lens 7. An image signal indicating the object image is output from the CCD 10, and is converted into digital image data in an analog/digital (A/D) conversion circuit 11. The digital image data is subjected to predetermined digital processing such as gamma correction or white balance adjustment in the digital processing circuit 12.

The digital image data output from the digital processing circuit 12 is given to a display control device 13, and a display device 14 is controlled by the display control device 13, so that the captured object image is displayed on a display screen of the display device 14. Further, as the digital image data is given to an external recording device through an output interface (not shown), the captured digital image data is recorded on the recording device.

The camera apparatus is provided with an auto focus (AF) command button 2. An auto focus (AF) command input through the AF command button 2 is given to the control device 1. Further, the camera apparatus also includes a memory 6 that stores predetermined data and an input device 9 for giving various commands to the control device 1. In addition, the camera apparatus is able to communicate with a different camera apparatus, or the like, and for the communication, a communication device 3 is provided in the camera apparatus. Data communication can be performed between the camera apparatus and the different camera apparatus using the communication device 3.

Figure 2:
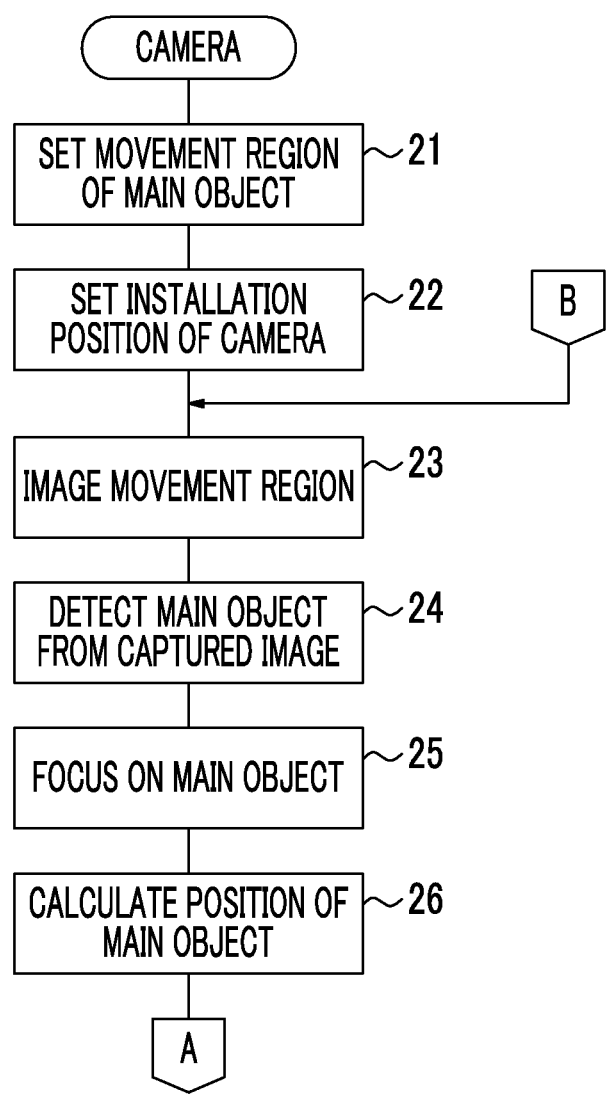
FIG. 2 is a flowchart illustrating a processing procedure of the camera apparatus.
Figure 3:
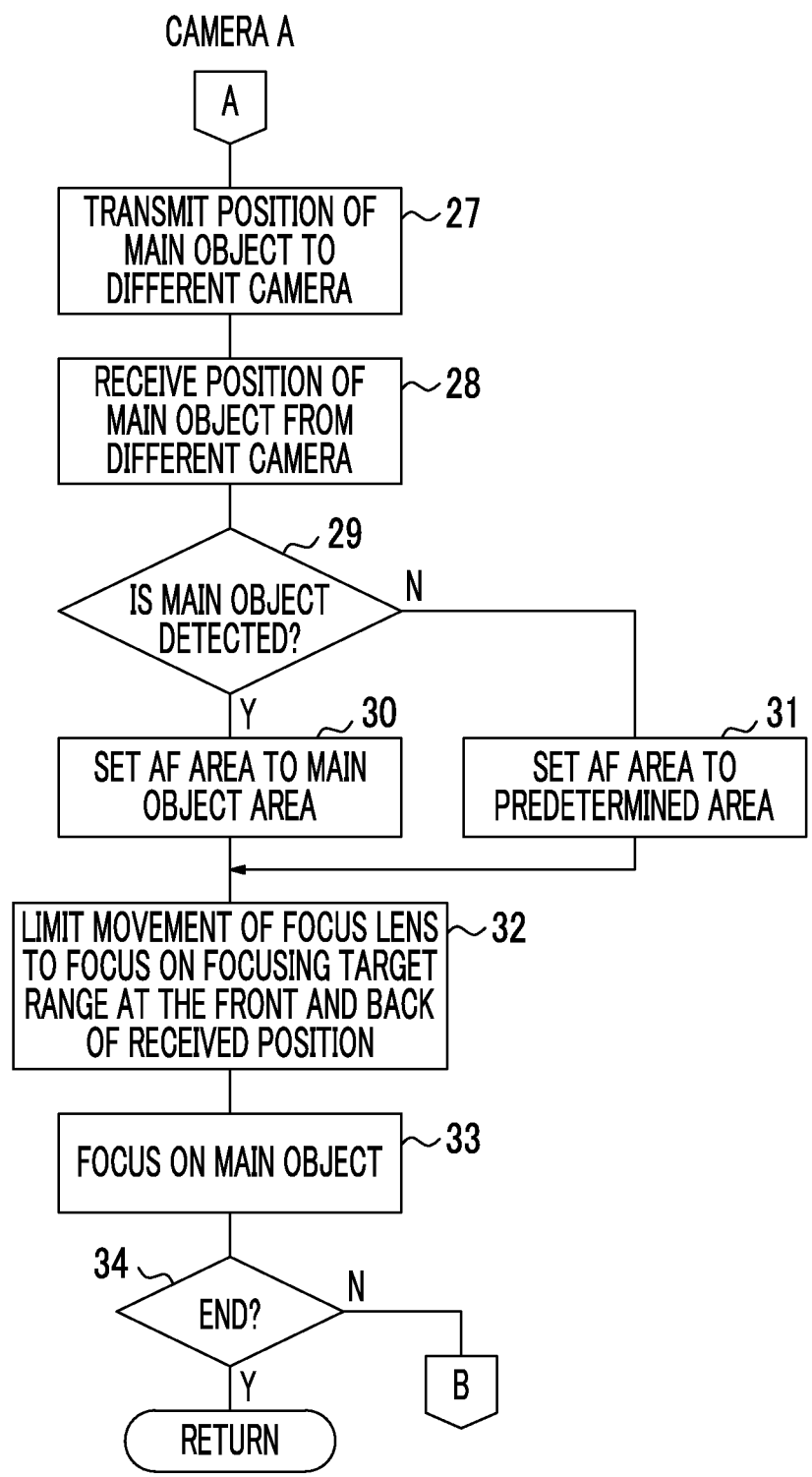
FIG. 3 is a flowchart illustrating a processing procedure of the camera apparatus.
Figure 4:
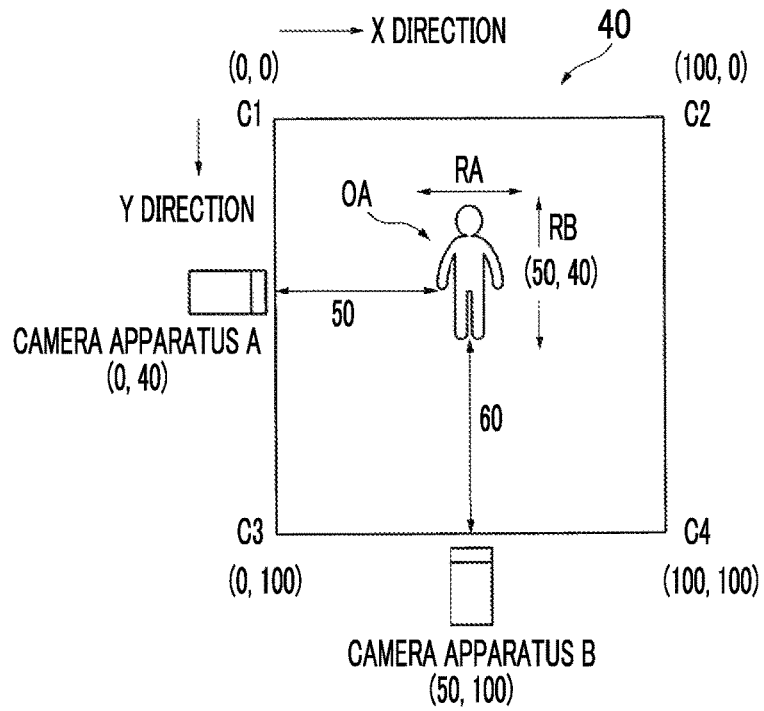
FIG. 4 is a diagram showing a movement region.

FIGS. 2 and 3 are flowcharts illustrating a processing procedure of a camera apparatus. FIG. 4 shows a state where camera apparatuses are used.

With reference to FIG. 4, a plurality of camera apparatuses A and B are used in this embodiment. A common main object is imaged using the plurality of camera apparatuses A and B. Both the camera apparatus A and the camera apparatus B have the electric configuration shown in FIG. 1. In FIG. 4, two camera apparatuses A and B are used, but three or more camera apparatuses may be used.

It is assumed that both the camera apparatus A and the camera apparatus B image a main object OA that is present in a movement region 40 of 100 m×100 m. It is not essential that the movement region 40 is defined, and it is sufficient if the positions of the camera apparatus A and the camera apparatus B in real space and the position of the main object OA in real space can be known. Further, in a case where an object (sub-object) other than the main object is present, it is sufficient if the position of the object other than the main object in real space can be known. The main object OA moves inside the movement region 40, but may not move. Data indicating (in a case where the main object is a human, data specifying the main object, such as the position of the eyes, the position of the nose, the position of the mouth, or the length of the feet) features of the main object OA is stored in advance in the memory 6 of the camera apparatus A and the camera apparatus B. Through this data, whether an imaged object is the main object OA in the camera apparatus A and the camera apparatus B may be determined. The movement region 40 may be represented by coordinates. In FIG. 4, when a lateral direction is an X direction and a longitudinal direction is a Y direction, coordinates of four corners C1, C2, C3, and C4 in the movement region 40 become (0, 0), (100, 0), (0, 100), and (100, 100). The camera apparatus A is provided at a position specified as coordinates (0, 40), and images the object in the movement region 40 at the position. The camera apparatus B is provided at a position specified as coordinates (50, 100), and images the object in the movement region 40 at the position. Both the camera apparatus A and the camera apparatus B may be provided at positions other than the positions specified as the coordinates (0, 40) and the coordinates (50, 100), respectively.

The processing procedure shown in FIGS. 2 and 3 is common to the camera apparatus A and the camera apparatus B, but it is assumed that the processing procedure relates to the camera apparatus A (an imaging apparatus).

A user of the camera apparatus A sets a range of the movement region 40 of the main object OA with respect to the camera apparatus A using the input device 9 of the camera apparatus A (step 21). Further, the user of the camera apparatus A sets the installation position (0, 40) of the camera apparatus A with respect to the camera apparatus A (step 22).

The movement region 40 (imaging range) is imaged using the CCD 10 (an imaging unit) of the camera apparatus A, and the main object OA is imaged (step 23). In a captured image obtained through the imaging, the main object OA is detected by the control device 1 (a main object recognition unit) using data indicating stored features of the main object OA (step 24) (recognition of the main object in the captured image). Then, the focus motor 8 is controlled by the control device 1 of the camera apparatus A so as to focus on the detected main object OA (step 25). The position of the focus lens 7 is controlled by the focus motor 8.

In a case where the position of the focus lens 7 is determined to focus on the main object OA, a distance from the camera apparatus A to the main object OA is calculated by the control device 1 using the position of the focus lens 7, a focal distance of the focus lens 7, and the like. The position of the main object OA in real space is calculated by the control device 1 on the basis of the distance from the camera apparatus A to the main object OA (step 26). As shown in FIG. 4, in a case where the main object OA is present at a distance of 50 m in front of the camera apparatus A, for example, the position of the main object OA in real space is calculated as (50, 40).

The processes from step 21 to step 26 are also performed in the camera apparatus B, the distance from the camera apparatus B to the main object OA in front of the camera apparatus B is 60 m, and thus, the position of the main object OA in real space is calculated as (50, 40).

In the camera apparatus A, in a case where the position of the main object OA is calculated, data indicating the calculated position of the main object OA is transmitted to the other camera apparatus B through the communication device 3 of the camera apparatus A (step 27). Similarly, in the other camera apparatus B, in a case where the position of the main object OA in real space is calculated, data indicating the calculated position of the main object OA (position specification information for specifying the position of the main object OA in the real space) is transmitted from the other camera apparatus B, and is received by the communication device 3 (a position specification information acquisition unit) of the camera apparatus A (step 28, acquisition of position specification information).

In a case where the main object OA is detected in the camera apparatus A (YES in step 29), an auto focus (AF) area is set to a main object area where the main object OA is present, in an imaging range, by the control device 1 (step 30).

Figure 6:
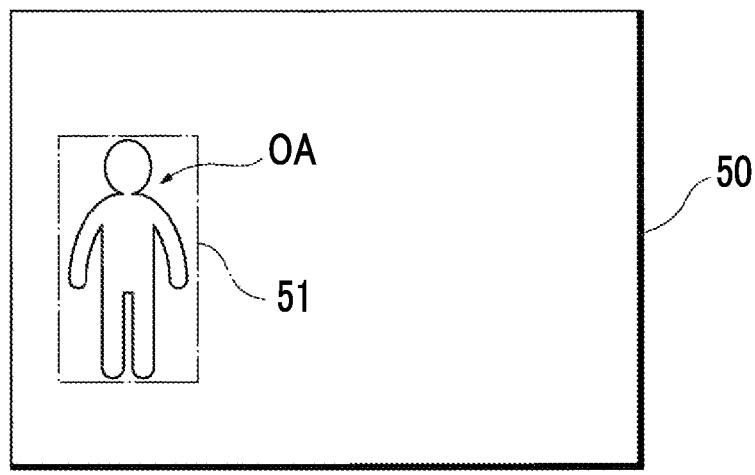
FIG. 6 is a diagram showing an example of a display screen.

FIG. 6 is a diagram showing a state where an AF area 51 is set as a main object area.

FIG. 6 shows a display screen 50 of the display device 14. The imaged main object OA (main object image) is displayed on the display screen 50. As the main object OA is detected, an area including the main object OA is set as the AF area 51. The position of the focus lens 7 is determined so that the object image displayed in the AF area 51 is in focus.

In a case where the main object OA is not detected (NO in step 29), the AF area 51 is set to a predetermined area, for example, a central area (step 31).

Figure 7:
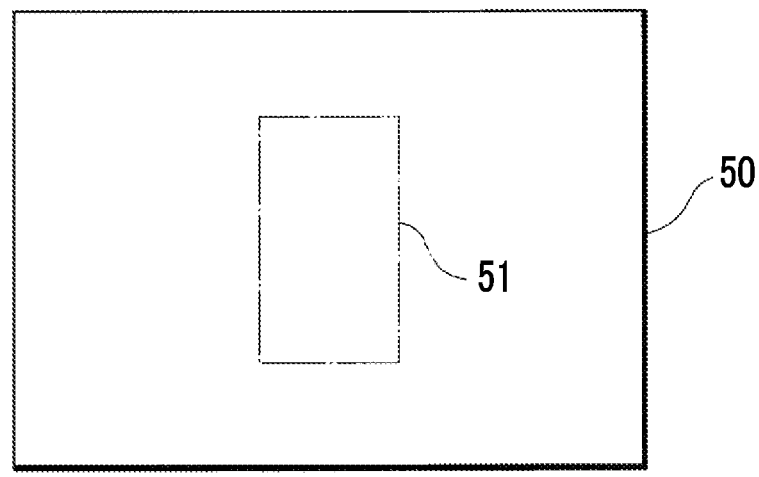
FIG. 7 is a diagram showing an example of a display screen.

FIG. 7 is a diagram showing a state where the AF area 51 is set to a predetermined area.

The AF area 51 is set at the center of the display screen 50 of the display device 14. The focus lens 7 is positioned so that an object image displayed in the AF area 51 that is set at the center is in focus.

In a case where the main object OA is not detected (NO in step 29), the AF area 51 may not be set to a predetermined area, but instead, data indicating the position of the main object OA may be received from the camera apparatus B, and then, the AF area 51 may be set to a position specified by the data.

In a case where the AF area 51 is set, a range defined at the front and back of the position (50, 40) of the main object OA represented by data transmitted from the camera apparatus B {at the front and back of the position (50, 40) of the main object OA when seen from the camera apparatus A} is set as a focusing target range by the control device 1 (step 32). The focusing target range refers to a range where the camera apparatus A performs imaging in a state of focusing on an object that is present within the range, and refers to a range defined at the front and back of the position (position specified by position information acquired in the position specification information acquisition unit) of the main object OA represented by the data transmitted from the camera apparatus B. The movement of the focus lens 7 of the camera apparatus A is limited by the control device 1 (a focusing control unit) to focus on the focusing target range (step 32).

Referring to FIG. 4, the position of the main object OA is represented by (50, 40), and a focusing target range RA in the camera apparatus A is set to a range of (45, 40) to (55, 40), for example.

The same processes are also performed in the camera apparatus B, and a focusing target range RB in the camera apparatus B is set to a range of (50, 35) to (50, 45), for example. Since the focusing target range RB in the camera apparatus B is used in a case where the camera apparatus B performs imaging, in a case where the main object OA is imaged from the camera apparatus B, the focusing target range RB in the camera apparatus B becomes a range at the front and back of the main object OA.

In a case where the focusing target range RA is set in the camera apparatus A, the movement of the focus lens 7 is limited, a main object image of the main object OA is focused on the light receiving surface of the CCD 10 by the focus lens 7 that is moved by the focus motor 8 (a focus unit), and the main object OA is imaged by the CCD 10 (an imaging apparatus) under the control of the control device 1 (an imaging control unit). Thus, focusing on the main object OA is performed, and the main object OA is imaged (step 33). In a case where a termination command is not given to the camera apparatus A (NO in step 34), the processes from step 23 to the subsequent steps are repeated.

Similarly, in a case where the focusing target range RB is also set in the camera apparatus B, the movement of the focus lens 7 is limited, a main object image of the main object OA is focused on the light receiving surface of the CCD 10 by the focus lens 7 that is moved by the focus motor 8 (a focus unit), and the main object OA is imaged by the CCD 10 (an imaging apparatus) under the control of the control device 1 (a imaging control unit).

In this embodiment, since the movement of the focus lens 7 is limited to focus on the range at the front and back of the position of the main object OA, even in a case where an obstructive object other than the main object OA is interposed between the main object OA and the camera apparatus A or the camera apparatus B, focusing on the obstructive object other than the main object OA is prevented. In a case where the obstructive object is removed, it is possible to rapidly perform a control for focusing on the main object OA.

Further, in this embodiment, the position of the main object OA is acquired from the camera apparatus B other than the camera apparatus A, and the focusing target ranges RA and RB are defined using the acquired position, but the focusing target ranges RA and RB may be defined using the position of the main object OA calculated in the camera apparatus A, instead of the position of the main object OA acquired from the camera apparatus B. In addition, in a case where three or more camera apparatuses are used, data indicating the position of the main object OA may be received from two or more camera apparatuses other than the camera apparatus A, and the focusing target range may be defined at the front and back of the position of the main object OA represented by the received data. Since the position of the main object OA is recognized using a plurality of pieces of data, the accuracy of the position is enhanced.

In the above-described embodiment, whether a certain object is the main object OA is determined using feature data stored in advance in each of the camera apparatus A and the camera apparatus B. In a case where there is a plurality of object images captured by the camera apparatus A and the camera apparatus B, data indicating the plurality of object images is transmitted to the other camera apparatus, and the camera apparatus that receives the data performs a process of matching the plurality of object images represented by the received data and object images obtained through imaging. Among the plurality of matched object images, each of the plurality of object images (in a case where the object image is a human image, the identity of each person) is recognized using the feature data that is stored in advance. In the matching process, since the camera apparatus A and the camera apparatus B have different field angles and different imaging directions, a conversion process of a field angle and an imaging direction is performed with respect to image data transmitted from the other camera apparatus, and thus, it can be considered that image data obtained in a case where imaging is performed at the same position is used.

In addition, the determination of whether the main object OA (in a case where a different object is present, the main object OA is replaced with the different object) imaged by the camera apparatus A and the main object OA imaged by the camera apparatus B are the same may be performed, in a case where the main object OA is a human, by imaging the main object OA from all angles, and using pattern matching between a plurality of colors, shapes, or the like, detection of a number such as a uniform number or a racing number given to the main object OA, or detection of characters such as alphabets or a character string, for recognition of an object, given to the main object OA, for example.

Further, installation positions of the camera apparatus A and the camera apparatus B may be detected using a global positioning system (GPS) in the camera apparatus A or the camera apparatus B.

Figure 5:
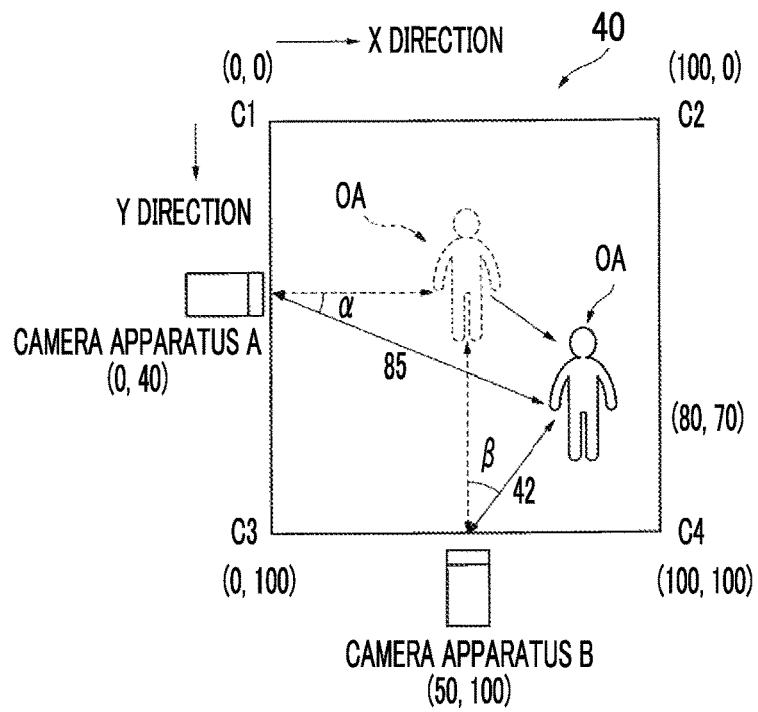
FIG. 5 is a diagram showing a movement region.

FIG. 5 is a diagram showing an example in a case where the object OA moves.

It is assumed that the main object OA moves from the position specified as (50, 40) to a position specified as (80, 70).

After movement of the main object OA, the main object OA is imaged by each of the camera apparatus A and the camera apparatus B, and focusing on the main object OA is performed. In the camera apparatus A, it can be known that the distance from the camera apparatus A to the main object OA is 85 m on the basis of the amount of movement of the focus lens 7. Further, a movement angle $\alpha$ can be known from a variation from the position before movement of the main object OA on the light receiving surface of the CCD 10 of the camera apparatus A to the position after movement thereof. The position of the main object OA after movement becomes (85×Cos $\alpha$+0, 85×Sin $\alpha$+40). In addition, in the camera apparatus B, similarly, it can be known that the distance from the camera apparatus B to the main object OA is 42 m on the basis of the amount of movement of the focus lens 7. Further, a movement angle $\beta$ can be known from a variation from the position before movement of the main object OA on the light receiving surface of the CCD 10 of the camera apparatus B to the position after movement thereof. The position of the main object OA after movement becomes (42×sin $\beta$+50, 100−42×cos $\beta$).

In this way, in a case where the position of the main object OA is represented by the distance from the camera apparatus to the main object OA and an angle formed by the camera apparatus and the main object OA, distance data and angle data respectively indicating the distances and angles are transmitted to the camera apparatus A from the camera apparatus B (a first position detection imaging apparatus), for example. The transmitted distance data (first distance data) and angle data (first angle data) are received through the communication device 3 (a first reception unit) of the camera apparatus A (an imaging apparatus), and position information (80, 70) for specifying the position of the main object OA is calculated from the received distance data and angle data by the control device 1 (a first calculation unit) of the camera apparatus A.

The position of the main object may be determined using calculation of spatial coordinates in the movement region 40 and a table, instead of using the distance data and the angle data. In any case, it is sufficient if the position of the main object OA can be given to the camera apparatus B from the camera apparatus A and can be given to the camera apparatus A from the camera apparatus B.

In the above-described embodiment, the main object OA is imaged in both the camera apparatus A and the camera apparatus B, but a configuration in which the main object OA is imaged in at least one of the camera apparatus A or the camera apparatus B may be used. For example, in a case where the main object OA is imaged only in the camera apparatus A, the camera apparatus B may be configured to detect the position of the main object OA. Data indicating the position detected in this way is transmitted to the camera apparatus A from the camera apparatus B.

Further, in the above-described embodiment, the focusing target ranges RA and RB are set to a range of 5 m at the front and back of the position of the main object OA, but the range of the focusing target ranges RA and RB may be changed according to a depth of field of the camera apparatus A or the camera apparatus B. In a case where the depth of field is shallow, the range of the focusing target ranges RA and RB may be set to be narrow, and in a case where the depth of field is deep, the range of the focusing target ranges RA and RB may be set to be wide. For example, in a case where the stop 4 is F4.0 and the focal distance of the focus lens 7 is 100 mm, the focusing target ranges RA and RB are 30 m to 70 m in a case where the distance up to the main object OA is 50 m. Further, in a case where the stop 4 is F2.0 and the focal distance of the focus lens 7 is 100 mm, the focusing target ranges RA and RB are 40 m to 60 m in a case where the distance to the main object OA is 50 m. Furthermore, in a case where the stop 4 is F2.0 and the focal distance of the focus lens 7 is 400 mm, the focusing target ranges RA and RB are 45 m to 55 m in a case where the distance to the main object OA is 50 m.

In addition, as the processes in FIGS. 2 and 3 are repeated, the main object OA is periodically imaged. In a case where the main object OA moves, the amount of movement (speed) of the main object OA is calculated in the control device 1 (a detection unit that detects the amount of movement of an object) of the camera apparatus A and the control device 1 of the camera apparatus B, on the basis of an imaging cycle of the main object OA and the amount of movement of the main object OA. In a case where the amount of movement of the main object OA is equal to or greater than a threshold value, if the movement range of the focus lens 7 is excessively narrow, focusing on the main object OA is not performed. Thus, the focusing target ranges RA and RB should be set to be wide. Contrarily, in a case where the amount of movement of the main object OA is smaller than the threshold value, the focusing target ranges RA and RB should be set to be narrow.

In a case where the movement range of the focus lens 7 of the camera apparatus A is limited, the amount of movement of the main object OA is calculated on the basis of an acquisition cycle of the position of the main object OA acquired from the camera apparatus B and a variation of the position. For example, when the acquisition cycle of the position acquired from the camera apparatus B is 1 second, the variation of the position at that time is 1 m, and a driving cycle of auto focus is 0.1 seconds, in a case where the distance to the main object OA is 50 m, the focusing target range RA is set to 48 m to 52 m. Further, when the acquisition cycle of the position acquired from the camera apparatus B is 1 second, the variation of the position at that time is 2 m, and the driving cycle of auto focus is 0.1 seconds, in a case where the distance to the main object OA is 50 m, the focusing target range RA is set to 45 m to 55 m. Furthermore, when the acquisition cycle of the position acquired from the camera apparatus B is 1 second, the variation of the position at that time is 2 m, and the driving cycle of auto focus is 0.2 seconds, in a case where the distance to the main object OA is 50 m, the focusing target range RA is set to 40 m to 60 m.

Further, it is also possible to calculate the amount of movement of the main object OA using a history of the distance to the main object OA in the camera apparatus A. In a case where the distance to the main object OA is changed from 49 m to 50 m, and in a case where the driving cycle of auto focus is 0.2 seconds, the focusing target range RA is set to 48 m to 52 m. In a case where the distance to the main object OA is changed from 48 m to 50 m, and in a case where the driving cycle of auto focus is 0.1 seconds, the focusing target range RA is set to 47 m to 53 m.

Figure 8:
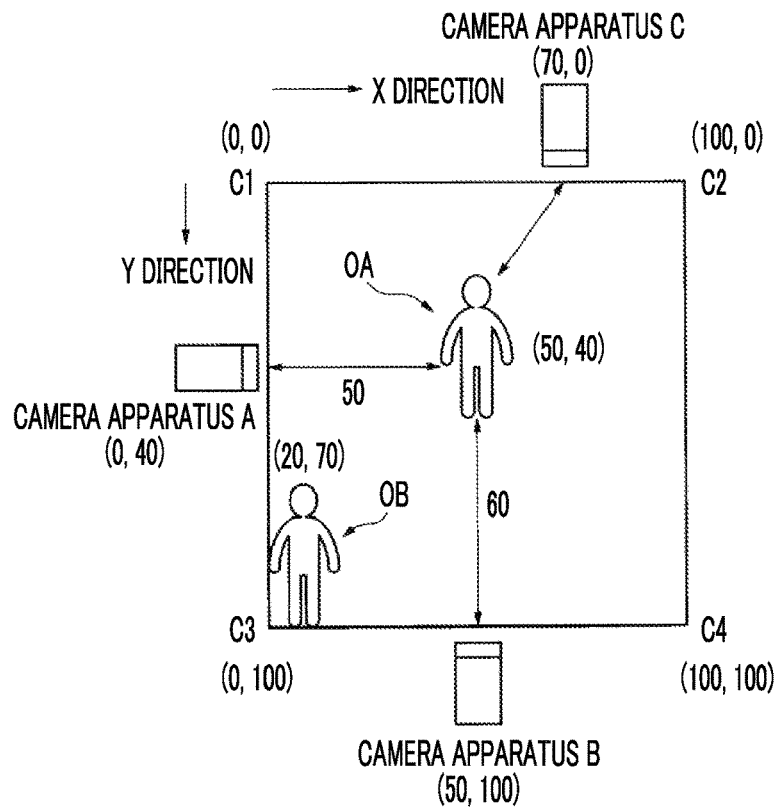
FIG. 8 is a diagram showing a movement region.
Figure 9:
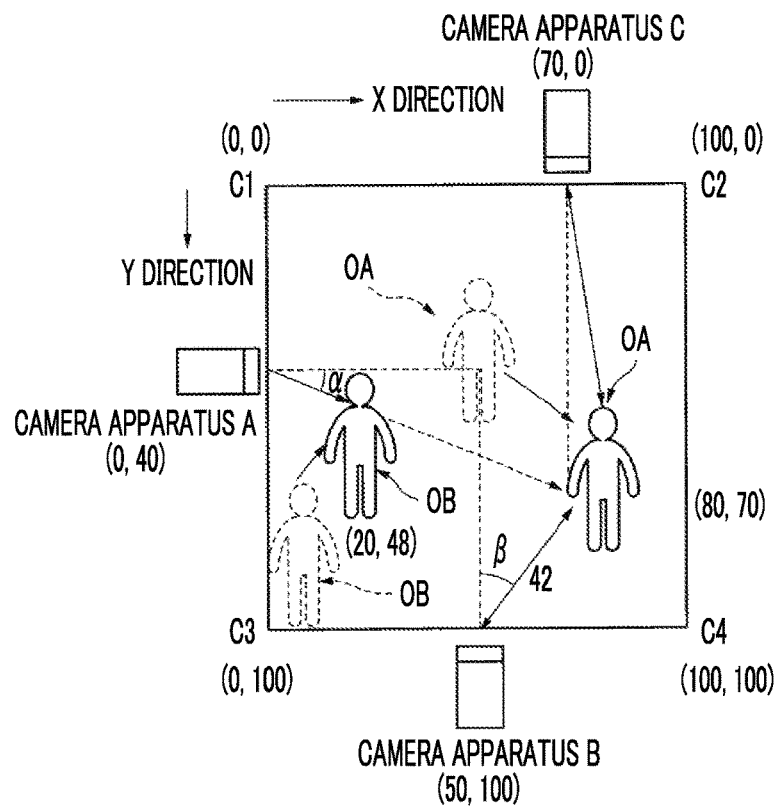
FIG. 9 is a diagram showing a movement region.

FIGS. 8 and 9 show another embodiment. FIGS. 8 and 9 show an example in which the main object OA is imaged using three camera apparatuses A, B, and C.

Referring to FIG. 8, an object OB, in addition to the main object OA, is present in the movement region 40. The object OB is present at a position specified as (20, 70). Further, the camera apparatus C is provided in addition to the camera apparatus A and the camera apparatus B. The camera apparatus A and the camera apparatus B are positioned at (0, 40) and (50, 100), in a similar way to the above-described embodiment, and the camera apparatus C is positioned at (70, 0).

The main object OA is imaged by each of the camera apparatuses A, B, and C, and distance data and angle data indicating distances from the camera apparatus A, the camera apparatus B, and the camera apparatus C to the main object OA and angles formed by the camera apparatuses and the main object OA are obtained. Distance data (first distance data) and angle data (first angle data) are transmitted from the camera apparatus B (a first position detection imaging apparatus) to the camera apparatus A (an imaging apparatus), and distance data (second distance data) and angle data (second angle data) are transmitted from the camera apparatus C (a second position detection imaging apparatus) to the camera apparatus A (an imaging apparatus). The distance data (first distance data) and the angle data (first angle data) transmitted from the camera apparatus B, and the distance data (second distance data) and the angle data (second angle data) transmitted from the camera apparatus C are received through the communication device 3 (a first reception unit) of the camera apparatus A. On the basis of at least one set among a set of the distance data (first distance data) and the angle data (first angle data) transmitted from the camera apparatus B and a set of the distance data (second distance data) and the angle data (second angle data) transmitted from the camera apparatus C, position specification information for specifying the position of the main object OA may be calculated by the control device (a first calculation unit) 1 of the camera apparatus A. In a case where the position of the main object OA is calculated using both the sets, the position of the main object OA may be calculated from each of both the sets, and an average of the obtained positions may be set as the position of the main object OA.

In addition, data indicating the position of the main object OA may be transmitted to the camera apparatus A from each of the camera apparatus B and the camera apparatus C. The control device 1 of the camera apparatus A may detect the position of the main object OA using data indicating the position of the main object OA transmitted from the camera apparatus B, may detect the position of the main object OA using data indicating the position of the main object OA transmitted from the camera apparatus C, or may detect the position of the main object OA using two pieces of data indicating the positions of the main object OA transmitted from the camera apparatuses B and C. In a case where the position of the main object OA is detected using the two pieces of data, an average position of the positions represented by the two pieces of data may be set as the position of the main object OA.

FIG. 9 shows a state where the main object OA and the object OB move.

It is assumed that the main object OA moves from the position specified as (50, 40) to a position specified as (80, 70) and the object OB moves from the position specified as (20, 70) to a position specified as (20, 48).

In this case, it is assumed that the object OB is interposed between the camera apparatus A and the main object OA, is not interposed between the camera apparatus B and the main object OA, and is not interposed between the camera apparatus C and the main object OA. The camera apparatus A cannot detect the position of the main object OA, but the camera apparatus B and the camera apparatus C can detect the position of the main object OA. Only with the camera apparatus A, focusing on the main object OA cannot be performed, and instead, focusing on the object OB is performed. In this embodiment, data indicating the position of the main object OA is transmitted to the camera apparatus A from the camera apparatus B and the camera apparatus C, and the movement of the focus lens 7 in the camera apparatus A is limited so as to focus on the vicinity of the main object OA. Thus, it is possible to prevent focusing on the object OB through auto focus, and in the camera apparatus A, it is possible to focus on a position where the main object OA is present using the data transmitted from the camera apparatus B and the camera apparatus C. In a case where the object OB further moves and the camera apparatus A can image the main object OA, the camera apparatus A can rapidly focus on the main object OA.

Figure 10:
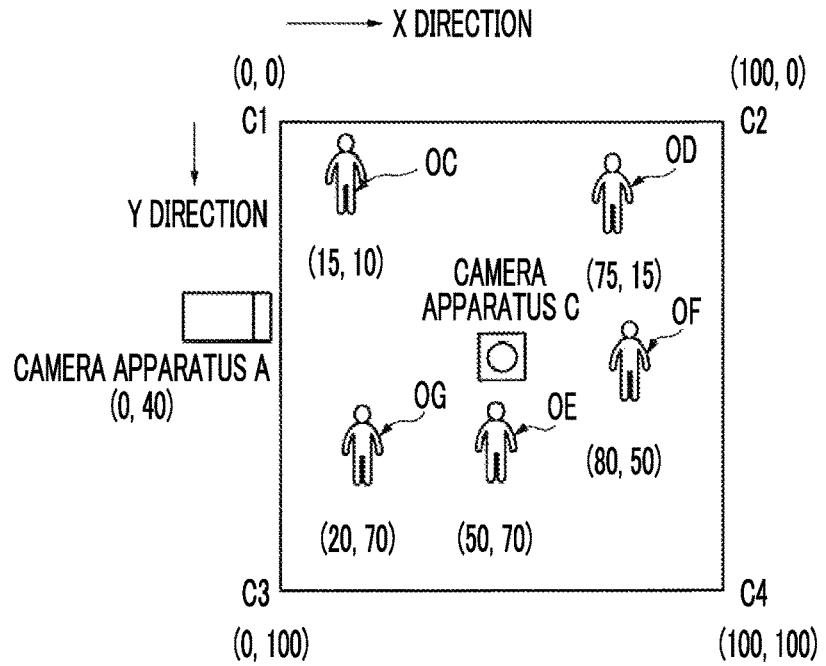
FIG. 10 is a diagram showing a movement region.
Figure 11:
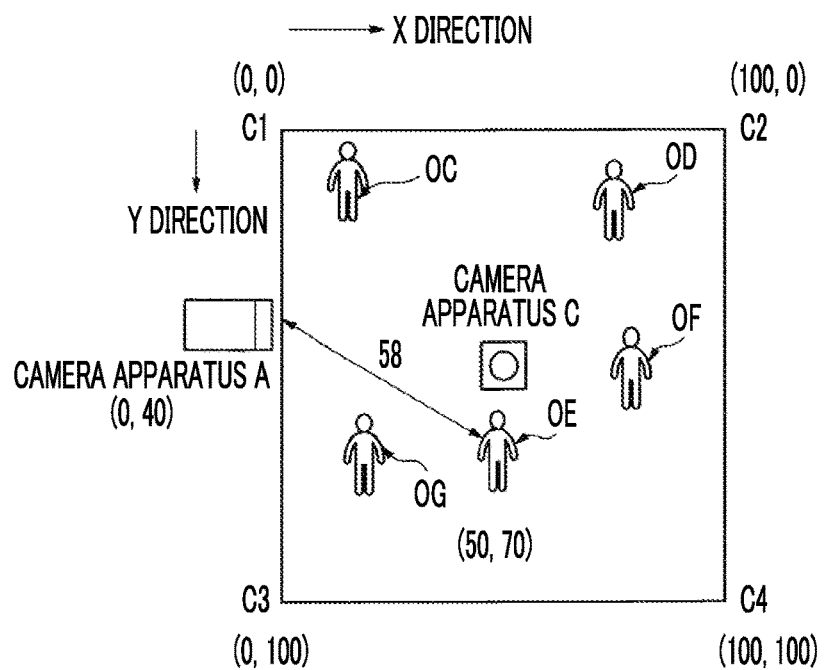
FIG. 11 is a diagram showing a movement region.

FIGS. 10 and 11 show another embodiment.

In FIGS. 10 and 11, the camera apparatus C is provided at a position where the movement region 40 can be imaged from above. In FIGS. 10 and 11, the camera apparatus C is provided approximately at the center (substantially at the center) of the movement region 40, but may not be provided approximately at the center.

Referring to FIG. 10, a plurality of objects OC, OD, OE, OF and OG are present in the movement region 40. The camera apparatus C detects the position of a desired object (main object) among the plurality of objects OC, OD, OE, OF, and OG, and transmits data indicating the position to the camera apparatus A. The position of an object determined by an instruction from the camera apparatus A may be detected by the camera apparatus C.

In a case where the data indicating the position transmitted from the camera apparatus C is received in the camera apparatus A, a distance to the position determined on the basis of the data is calculated in the camera apparatus A, and a focusing target range is determined. For example, in a case where data indicating the position (50, 70) of the object OE is transmitted to the camera apparatus A from the camera apparatus C, as shown in FIG. 11, a distance (for example, 58 m) to the object OE is calculated in the camera apparatus A, and a range from 53 m to 63 m from the camera apparatus A is determined as the focusing target range. The movement of the focus lens 7 in the camera apparatus A is limited so that focusing is performed in the range.

Figure 12:
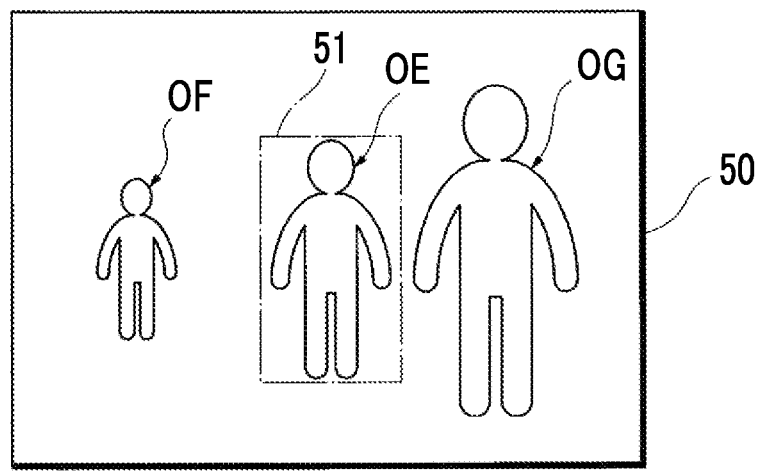
FIG. 12 is a diagram showing an example of a display screen.

FIG. 12 is a diagram showing an example of the display screen 50 of the display device 14 in the camera apparatus A in a case where the movement region 40 shown in FIG. 11 is imaged in the camera apparatus A.

The objects OF, OE, and OG are imaged by the camera apparatus A. In a case where data indicating the position (50, 70) of the object OE is transmitted from the camera apparatus C to the camera apparatus A, it is determined that the object OE is a main object, and an area 51 is set to an area where the main object is present. Focusing on the object OE that is present in the AF area 51 is performed.

Further, in a case where the object is directed in a backward direction, or in a case where the object is directed in a downward direction, it may be impossible to recognize the object. In a case where the object is not recognized in all the camera apparatuses, position information on the object cannot be acquired. In order to prevent such a problem, it is preferable to acquire, even with respect to an object that is not auto-focused, a phase difference amount of an object that is object-recognized and to calculate a distance to the object. In the case of FIG. 12, it is possible to image the objects OF, OE, and OG, to calculate a phase difference amount of an object image of each object, and to calculate distances to the objects OF, OE, and OG from the calculated phase difference amounts. Thus, a possibility that object position information can be acquired increases.

Figure 13:
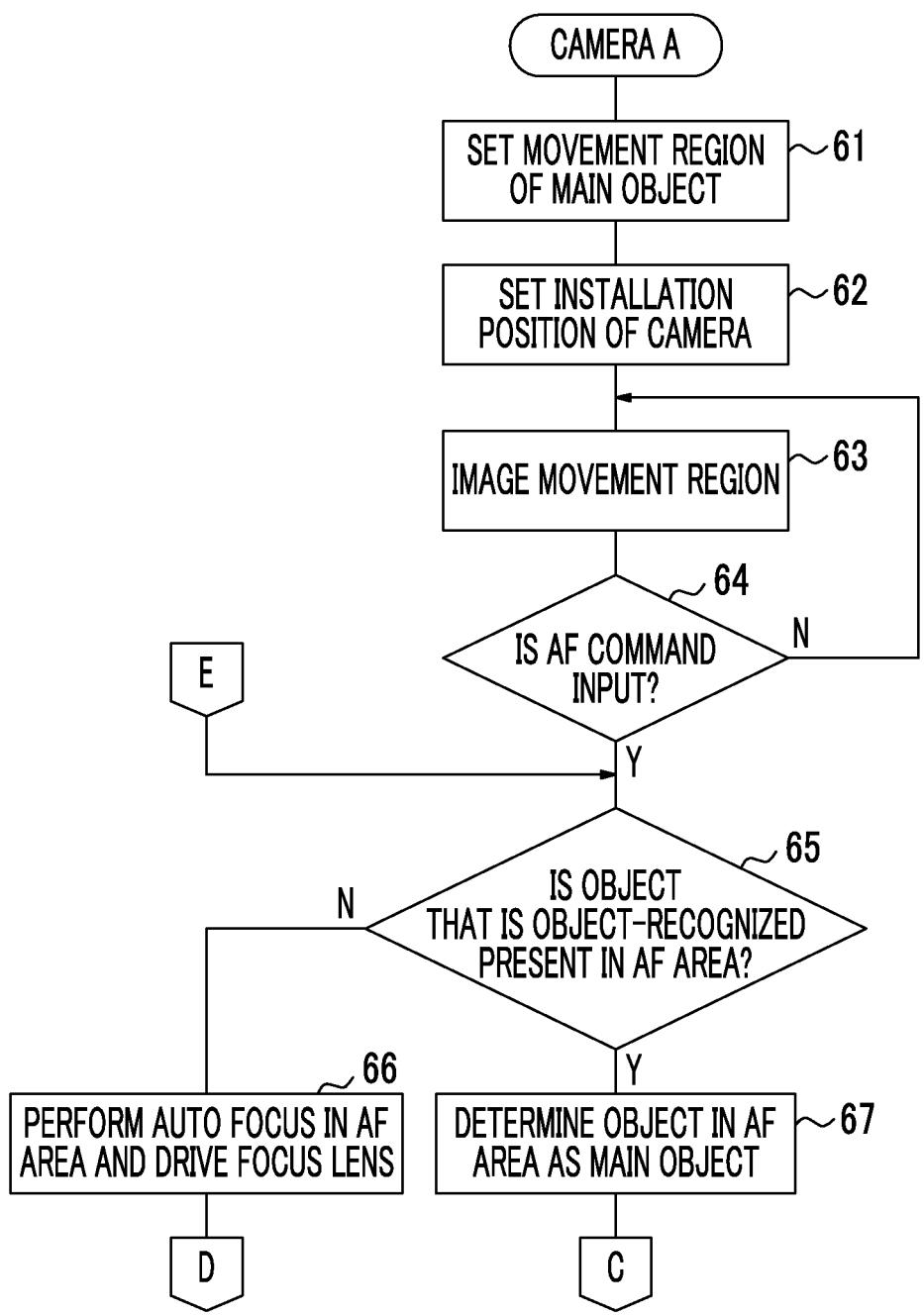
FIG. 13 is a flowchart illustrating a processing procedure of the camera apparatus.
Figure 14:
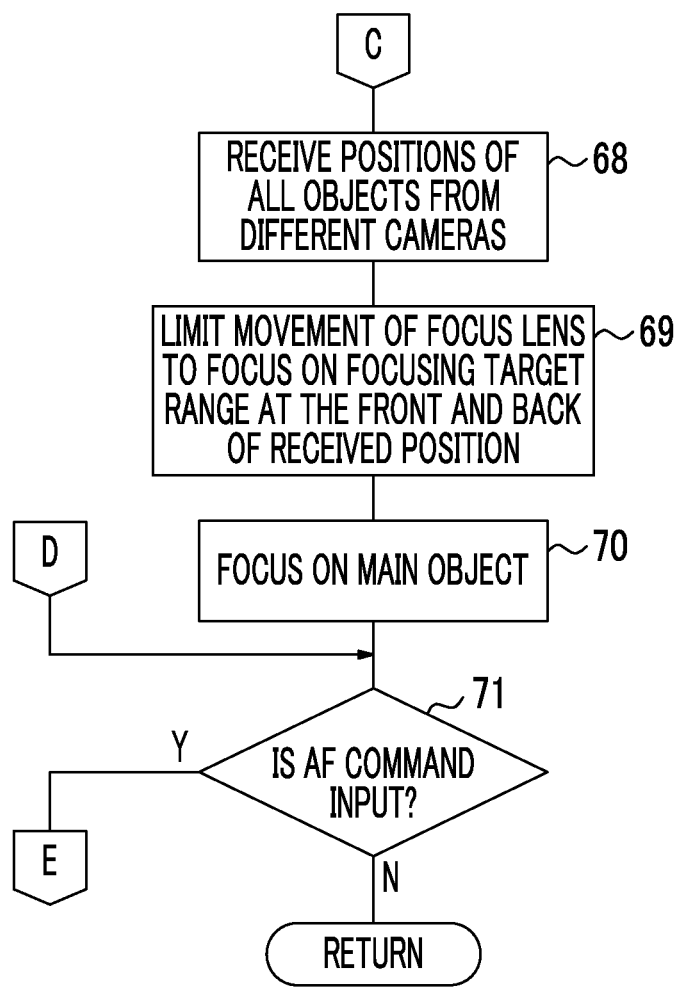
FIG. 14 is a flowchart illustrating a processing procedure of the camera apparatus.

FIGS. 13 and 14 illustrate another embodiment, which are flowcharts illustrating a processing procedure of the camera apparatus A.

This processing procedure relates to changing a main object in a case where a plurality of objects is present in the movement regions 40. In a case where a plurality of objects moves in the movement region 40 and follows a main object, it is possible to change a main object to be followed. Here, this is similarly applied to a case where the objects do not move.

As shown in FIG. 8, it is assumed that the camera apparatus A, the camera apparatus B, and the camera apparatus C are provided in the movement region 40. Three camera apparatuses A, B, and C are used, but two or four or more camera apparatuses may be used. It is assumed that the object OA and the object OB are present in the movement region 40.

The movement region 40 where the object OA is present and a setting position of the camera apparatus A are set in the camera apparatus A by a user of the camera apparatus A (steps 61 and 62), and the movement region 40 is imaged by the camera apparatus A (step 63). In a case where an AF command is input to the camera apparatus A through the AF command button 2 (an AF command input unit) of the camera apparatus A (YES in step 64), object recognition is performed with respect to an object included in the AF area of the camera apparatus A, and it is confirmed whether an object that is object-recognized is included in the AF area of the camera apparatus A (step 65). Specifically, in the camera apparatus A, feature data through which the object OA that is present in the movement region 40 can be recognized and feature data through which the object OB that is present in the movement region 40 can be recognized are stored in advance in the memory 6, and it is confirmed whether the object that is present in the AF area is recognized as the object OA or the object OB by the pieces of feature data that are stored in advance.

In a case where the object that is object-recognized is included in the AF area of the camera apparatus A (YES in step 65), it is determined by the control device 1 (a main object determination unit) included in the camera apparatus A that the object included in the AF area is a main object (step 67). For example, in a case where it is determined by the control device 1 that the object OA is present in the AF area, it is determined by the control device 1 that the object OA is the main object. In a case where it is determined by the control device 1 that the object OB is present in the AF area, it is determined by the control device 1 that the object OB is the main object.

Data (position specification information) indicating the positions of the object OA and the object OB that are present in the movement region 40 and are object-recognized, together with identification data indicating that the data relates to the object OA or the object OB, is transmitted to the camera apparatus A from the other camera apparatus B and camera apparatus C. In the camera apparatus A, the data indicating the positions and the identification data, transmitted from the camera apparatus B and the camera apparatus C, are received through the communication device 3 (a position specification information acquisition unit) (step 68). Any one of the object OA and the object OB is determined as a main object, and it is considered that position specification information for specifying the position of the determined main object in real space is received. In the camera apparatus A, a range at the front and back of a position represented by position data on the object OA or the object OB that is determined as the main object is determined as a focusing target range by the control device 1, and a movement range of the focus lens 7 is controlled by the control device 1 (a focusing control unit) (step 69). The focus lens 7 is controlled by the focus motor 8 (a focus unit), to thereby focus on the determined main object (step 70). In this way, it is possible to determine a desired object as a main object.

In a case where an object that is object-recognized is not included in the AF area of the camera apparatus A (NO in step 65), an auto focus process of positioning the focus lens 7 so as to focus on a predetermined object included in the AF area is performed (step 66).

In a case where an AF command is input to the camera apparatus A again, the processes from step 65 to the subsequent steps are repeated. By changing a camera angle of the camera apparatus A to cause an object to be changed to a main object to be included in the AF area, it is possible to change the object to the main object.

Figure 15:
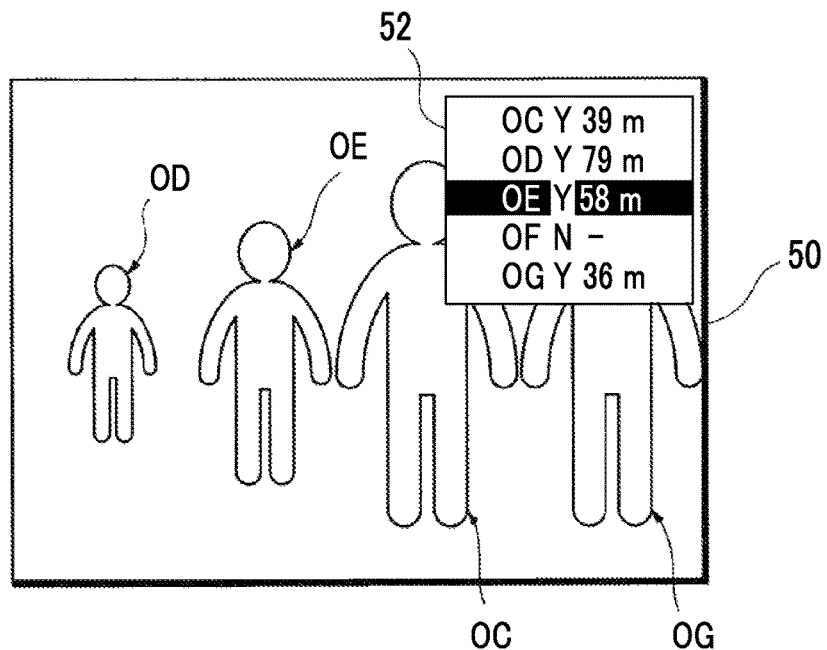
FIG. 15 is a diagram showing an example of a display screen.
Figure 16:
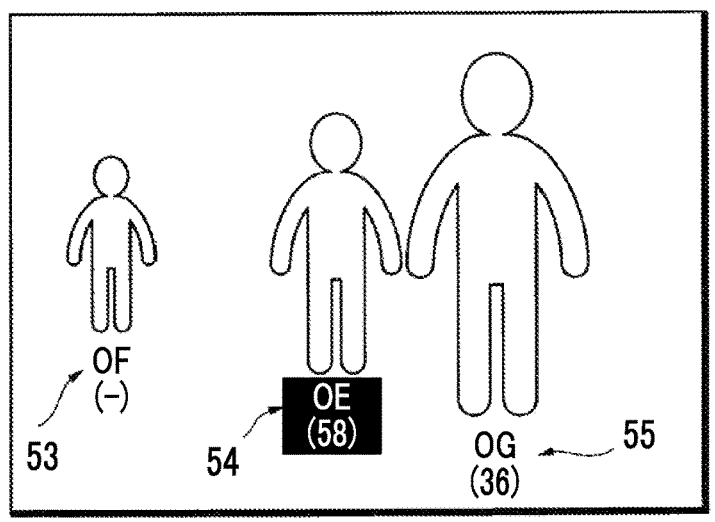
FIG. 16 is a diagram showing an example of a display screen.

FIGS. 15 and 16 show modification examples.

FIG. 15 is an example of a display screen 50 of the camera apparatus A.

As shown in FIG. 10, it is assumed that the objects OC, OD, OE, OF, and OG are included in the movement region 40.

As shown in step 68 of FIG. 14, data indicating the positions of the objects OC, OD, OE, OF, and OG, together with identification data for identifying the objects OC, OD, OE, OF, and OG, is transmitted to the camera apparatus A from the other camera apparatus B and the like, and in the camera apparatus A, the data indicating the positions and the identification data are received. For example, the object OE may be recognized as a main object, and the objects other than the object OE may be recognized as sub-objects.

Distances to the respective objects OC, OD, OE, OF, and OG from the camera apparatus A are calculated by the control device 1 (a distance calculation unit) of the camera apparatus A using the received data indicating the positions and an installation position of the camera apparatus (calculation of a distance to a main object and distances to sub-objects using the distance calculation unit). On the display screen 50 of the display device 14, a distance display region 52 for displaying the distances to the respective objects OC, OD, OE, OF, and OG from the camera apparatus A is formed by the display control device 13 (a display control unit). The main object OE and the sub-objects OC, OD, and OG are recognized by the control device 1 (a main object recognition unit and a sub-object recognition unit). The distances to the respective objects OC, OD, OE, OF, and OG from the camera apparatus A are displayed in the distance display region 52. In the camera apparatus A, in a case where an object is not recognized and a distance to the object can be calculated, the distance to the object is displayed and a character "Y" is displayed with respect to the object. In the camera apparatus A, in a case where an object is not recognized or a distance to the object cannot be calculated, a character "N" is displayed with respect to the object. In a case where an object for which the character "Y" is displayed (in the example shown in FIG. 15, the objects OC, OD, OE, and OG) is set as a main object (for example, in step 65 of FIG. 13, in a case where an object is included in the AF area), since a focusing target range is defined at the front and back of a position where the main object is present, even in a case where a different object is interposed between the main object and the camera apparatus A, it is possible to prevent focusing on the different object.

Further, in the distance display region 52 shown in FIG. 15, light and shade are reversely shown with respect to an object (object OE) that is set as a main object. Thus, it is possible for a user of the camera apparatus A to relatively simply know which object among the objects is a main object.

FIG. 16 is an example of the display screen 50 of the display device 14.

In the example shown in FIG. 16, similar to the example shown in FIG. 15, data indicating the positions of objects that are present in the movement region 40 and identification data on the objects are transmitted from the camera apparatuses other than the camera apparatus A, and are received in the camera apparatus A. The positions of the objects are calculated by the control device 1 of the camera apparatus A from the received position data and installation position of the camera apparatus A. Objects (in the example shown in FIG. 16, the main object OE and the sub-objects OF and OG) imaged in the camera apparatus A are displayed on the display screen 50, and distances from the camera apparatus A are displayed in brackets under the displayed objects by the display control device 13 (a display control unit). Since a focusing target range is defined at the front and back of a position where the main object OE is present, even in a case where a different object is interposed between the main object OE and the camera apparatus A, it is possible to prevent focusing on the different object.

Further, in the example shown in FIG. 16, similarly, light and shape are reversely shown with respect to an object (object OE) that is set as a main object. Thus, it is possible for the user of the camera apparatus A to relatively simply know which object among the objects is a main object.

The distance display in the distance display region 52 as shown in FIG. 15 and the distance display under the objects as shown in FIG. 16 may be performed together.

Figure 17:
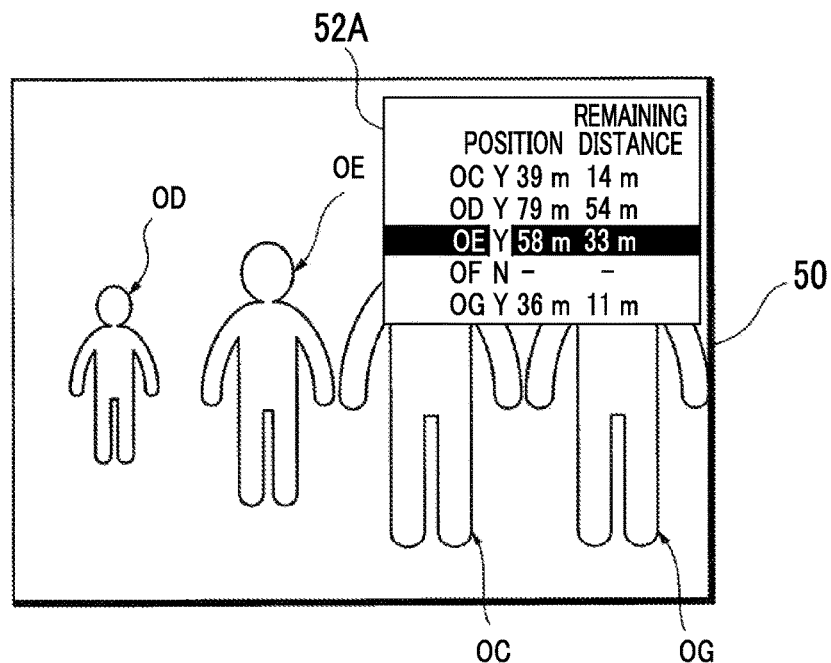
FIG. 17 is a diagram showing an example of a display screen.
Figure 18:
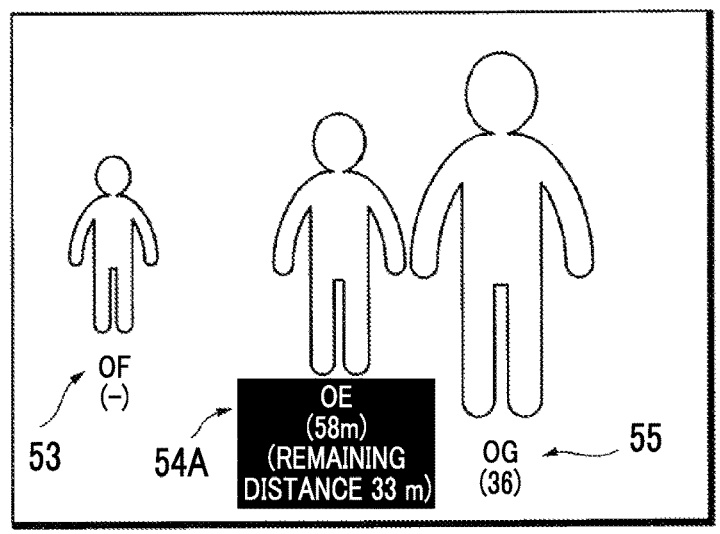
FIG. 18 is a diagram showing an example of a display screen.

FIGS. 17 and 18 show another modification examples.

FIG. 17 corresponds to FIG. 15, which shows an example of the display screen 50 of the display device 14.

In the example shown in FIG. 17, a distance display region 52A is displayed on the display screen 50. Similar to the example shown in FIG. 15, data indicating the positions of the objects OC, OD, OE, OF, and OG included in the movement region 40 and identification data on the objects that are present at the positions are transmitted to the camera apparatus A from the other camera apparatus B and the like. In the camera apparatus A, the data indicating the positions and the identification data are received, and distances to the respective objects, at the positions of the main object OE and the sub-objects OC, OD, OF, and OG, from the camera apparatus A are calculated in the control device 1 of the camera apparatus A, using an installation position of the camera apparatus A. Further, in the control device 1 of the camera apparatus A, a distance to an object that is currently in focus is calculated on the basis of the position of the focus lens 7. The distance to the object that is currently in focus and the remaining distances to the respective positions of the main object OE and the sub-objects OC, OD, OF, and OG (the sub-objects OC, OD, OF, and OG are recognized by the control device 1, in which the control device 1 serves as a sub-object recognition unit) are calculated by the control device 1 (a remaining distance calculation unit). The calculated remaining distances are displayed in the distance display region 52A with respect to the objects OC, OD, OE, OF, and OG. Since the remaining distances to the objects can be known, the user of the camera apparatus A can relatively simply focus on a desired object, for example, even in a case where the user focuses on an object by himself or herself.

FIG. 18 corresponds to FIG. 16, which shows an example of the display screen 50 of the display device 14.

In the example shown in FIG. 18, similar to the example shown in FIG. 17, remaining distances to objects are calculated by the control device 1 of the camera apparatus A. The calculated remaining distances are displayed in association with the objects. In the example shown in FIG. 18, similarly, since the remaining distances to the objects can be known, a user of the camera apparatus A can relatively simply focus on a desired object, for example, even in a case where the user focuses on an object by himself or herself.

In both the examples in FIGS. 17 and 18, with respect to an object determined as a main object, light and shade are reversely shown with respect to the remaining distances or the like.

In FIGS. 15 to 18, the main object is the object OE, but the other objects OG or the like may be defined as sub-objects. In this case, as well as the main object OE, with respect to sub-objects, similarly, distances to the sub-objects from the camera apparatus A and remaining distances are calculated and displayed. In a case where the main object is changed to the sub-object OG or the like from the object OE, similarly, the distances and remaining distances may be used.

FIGS. 19 to 22 show another embodiment. In this embodiment, it is determined whether a positional relationship of objects included in the movement region 40 is abnormal. In a case where it is determined that the positional relationship is abnormal, a re-recognition process is performed with respect to an object for which it is determined that the positional relationship is abnormal. Thus, the accuracy of object recognition is enhanced.

Figure 19:
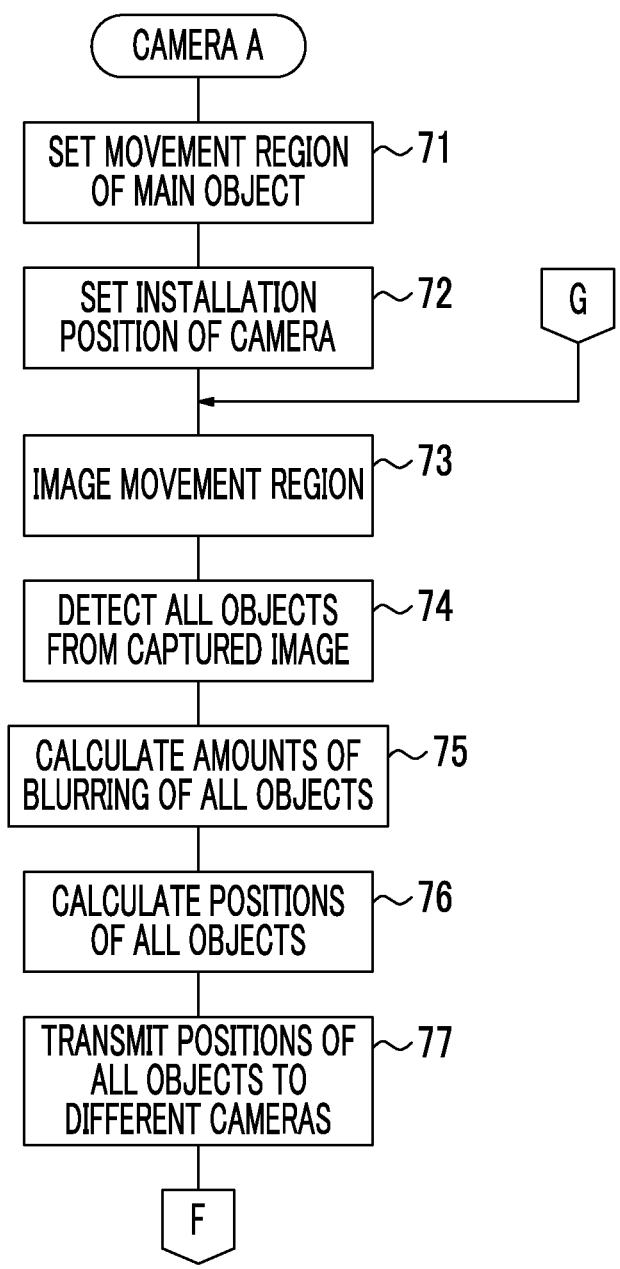
FIG. 19 is a flowchart illustrating a processing procedure of the camera apparatus.
Figure 20:
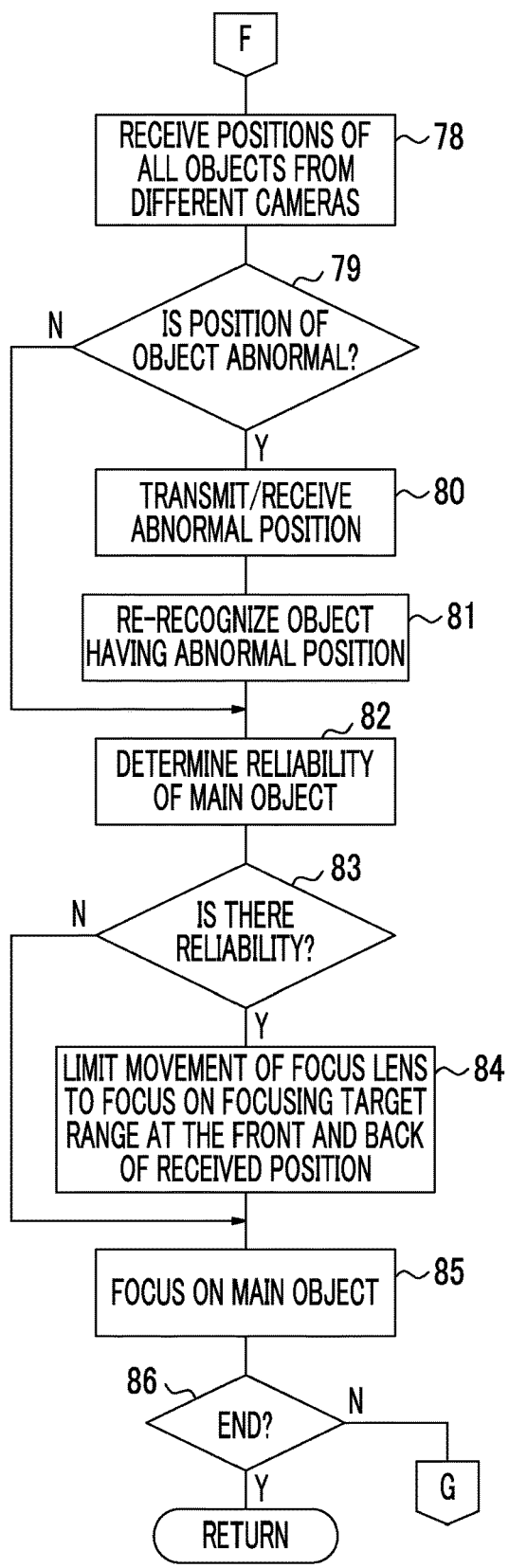
FIG. 20 is a flowchart illustrating a processing procedure of the camera apparatus.
Figure 21:
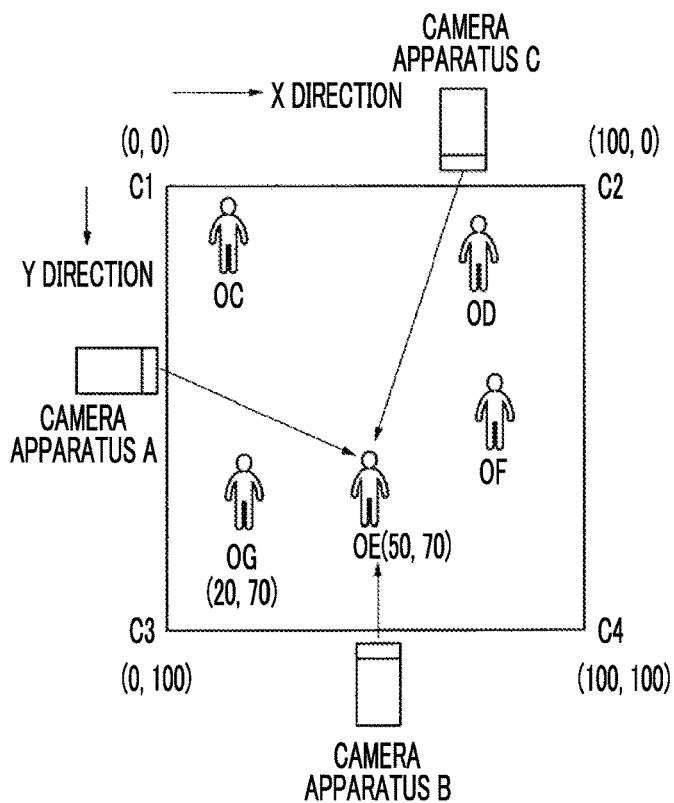
FIG. 21 is a diagram showing a movement region.
Figure 22:
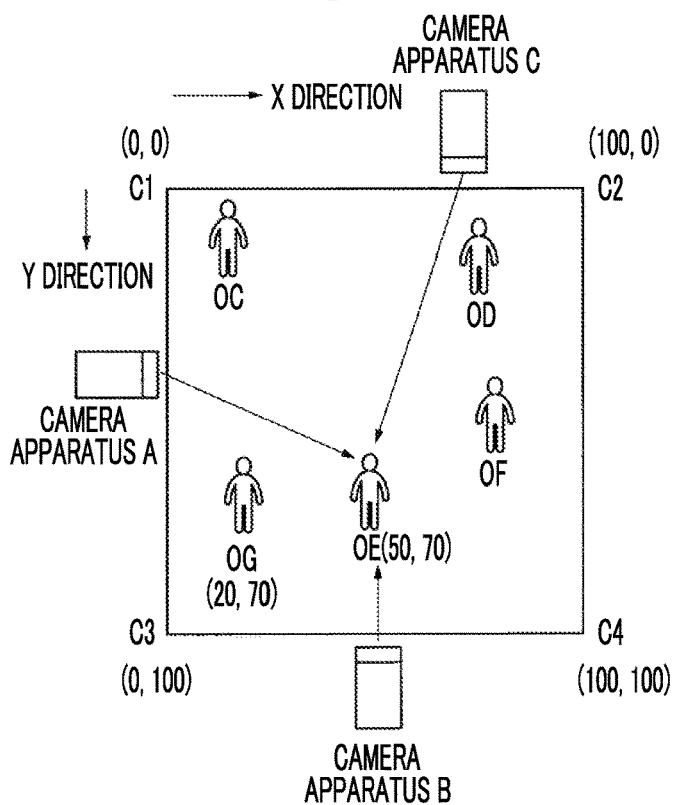
FIG. 22 is a diagram showing a movement region.

FIGS. 19 and 20 are flowcharts illustrating a processing procedure of the camera apparatus A. FIGS. 21 and 22 show a relationship between the movement region 40 and the camera apparatuses A, B, and C. In FIGS. 21 and 22, it is assumed that the object OE is a main object.

In the camera apparatus A, the movement region 40 of the main object OE is set (step 71), and an installation position of the camera apparatus A is set (step 72). The movement region 40 is imaged in the camera apparatus A (step 73), and all the objects OC, OD, OE, OF, and OG are detected using feature data stored in the camera apparatus A from captured images (step 74), and the amounts of blurring of all the detected objects OC, OD, OE, OF, and OG are calculated (step 75). Then, the positions of all the objects OC, OD, OE, OF, and OG are calculated by the control device 1 of the camera apparatus A from the calculated amounts of blurring (step 76). Position data indicating the calculated positions of all the objects OC, OD, OE, OF, and OG and identification data on the objects are transmitted to the other camera apparatus B and camera apparatus C (step 77). Further, the position data on all the objects OC, OD, OE, OF, and OG and the identification data transmitted from the other camera apparatus B and the camera apparatus C are received in the camera apparatus A (step 78).

It is determined by the control device 1 (a mismatch determination unit) of the camera apparatus A whether the positions of the objects OC, OD, OE, OF, and OG calculated in the camera apparatus A and the positions of the objects OC, OD, OE, OF, and OG that are calculated in the camera apparatus B or the camera apparatus C and are represented by data indicating the positions transmitted from the camera apparatus B or the camera apparatus C do not match each other and are abnormal (step 79). It is sufficient if it is determined by the control device 1 (a mismatch determination unit) whether at least the position of the main object OE is abnormal. As described above, it may be determined by the control device 1 whether the positions of the sub-objects OC, OD, OF, and OG other than the main object OE do not match each other. In a case where the abnormality is present, the position of an object for which it is considered that the abnormality is present and identification data on the object are transmitted from the camera apparatus A to the camera apparatus B and the camera apparatus C. Further, in a case where it is determined that the position of an object is abnormal in the camera apparatus B or the camera apparatus C, the position of the object for which it is considered that the position is abnormal and identification data on the object are transmitted to the camera apparatus A from the camera apparatus B or the camera apparatus C, and are received in the camera apparatus A (step 80). With respect to the object for which it is determined that the position is abnormal, a re-recognition process is performed in the camera apparatus A (step 81). With respect to an object for which it is determined that its position is abnormal in the camera apparatus B and the camera apparatus C, similar to the camera apparatus A, the re-recognition process is performed by the control device 1 (a recognition control unit). In a case where a result obtained in the re-recognition process is different from a previous result, identification data on the object indicating the result and position data on the object are transmitted to the other camera apparatuses.

Whether the position of an object is abnormal is determined according to whether the same object is present at the same position. In a case where it is considered that the same object is present at a distance shorter than a predetermined threshold value, it is determined that the same object is present at the same position. Further, in a case where it is determined that the number of objects for which it is considered that the objects are present at the same positions varies in the camera apparatuses, it is determined that the position is abnormal.

Referring to FIG. 21, in the camera apparatus A, it is assumed that the object OE is recognized as the object OE and the position of the object OE is calculated as (48, 69). Similarly, in the camera apparatus B, it is assumed that the object OE is recognized as the object OE and the position of the object OE is calculated as (51, 70). Further, in the camera apparatus C, it is assumed that the object OE is mistakenly recognized as the object OC and the position of the object OC that is mistakenly recognized as the object OC is calculated as (51, 71). The object OE that is recognized in the camera apparatus A and the camera apparatus B and the object OC that is recognized in the camera apparatus C are present approximately at the same position, and thus, it is determined that the position of the main object OE is abnormal in the camera apparatus A, and a re-recognition process of the main object OG is performed.

Returning to FIG. 20, in the camera apparatus A, a reliability of a main object is determined by the control device 1 (a reliability calculation unit) (step 82). The reliability of the main object means a probability of a position relating to the main object OE, and a probability that it is determined that an object determined as the main object OE is a real main object OE.

In a case where there is a reliability with respect to the main object OE (YES in step 83), positions at the front and back of the position of the main object OE are set as a focusing target range, and the movement of the focus lens 7 is controlled to focus on the focusing target range (step 84). In a case where there is no reliability with respect to the main object OE (NO in step 83), the process of step 84 is skipped, and focusing on the main object OE is performed (step 85). In a case where a termination command is not given (NO in step 86), the processes from step 73 to the subsequent steps are repeated again.

Further, as shown in FIG. 22, in the camera apparatus A, it is assumed that the main object OE is determined as the main object OE and its position is calculated as (48, 69), and that the object OG is determined as the object OG and its position is calculated as (21, 71). Further, in the camera apparatus B, it is assumed that the main object OE is determined as the main object OE and its position is calculated as (51, 70). In addition, in the camera apparatus C, it is assumed that the main object OE is mistakenly determined as the object OG and its position is calculated as (52, 73). Since the different objects OE and OG are present at approximately the same position, the re-recognition process (step 81) is performed in the camera apparatus A. In addition, since a difference between the position (21, 71) of the object OG calculated in the camera apparatus A and the position (52, 73) of the object OG that is mistakenly recognized in the camera apparatus C is excessively large, the re-recognition process with respect to the object OG is performed in the camera apparatus A. In this way, the re-recognition process may also be performed with respect to the sub-object OG. In the camera apparatus B and the camera apparatus C, similar to the camera apparatus A, it is needless to say that the re-recognition process may be performed with respect to the objects OE and OG.

Figure 23:
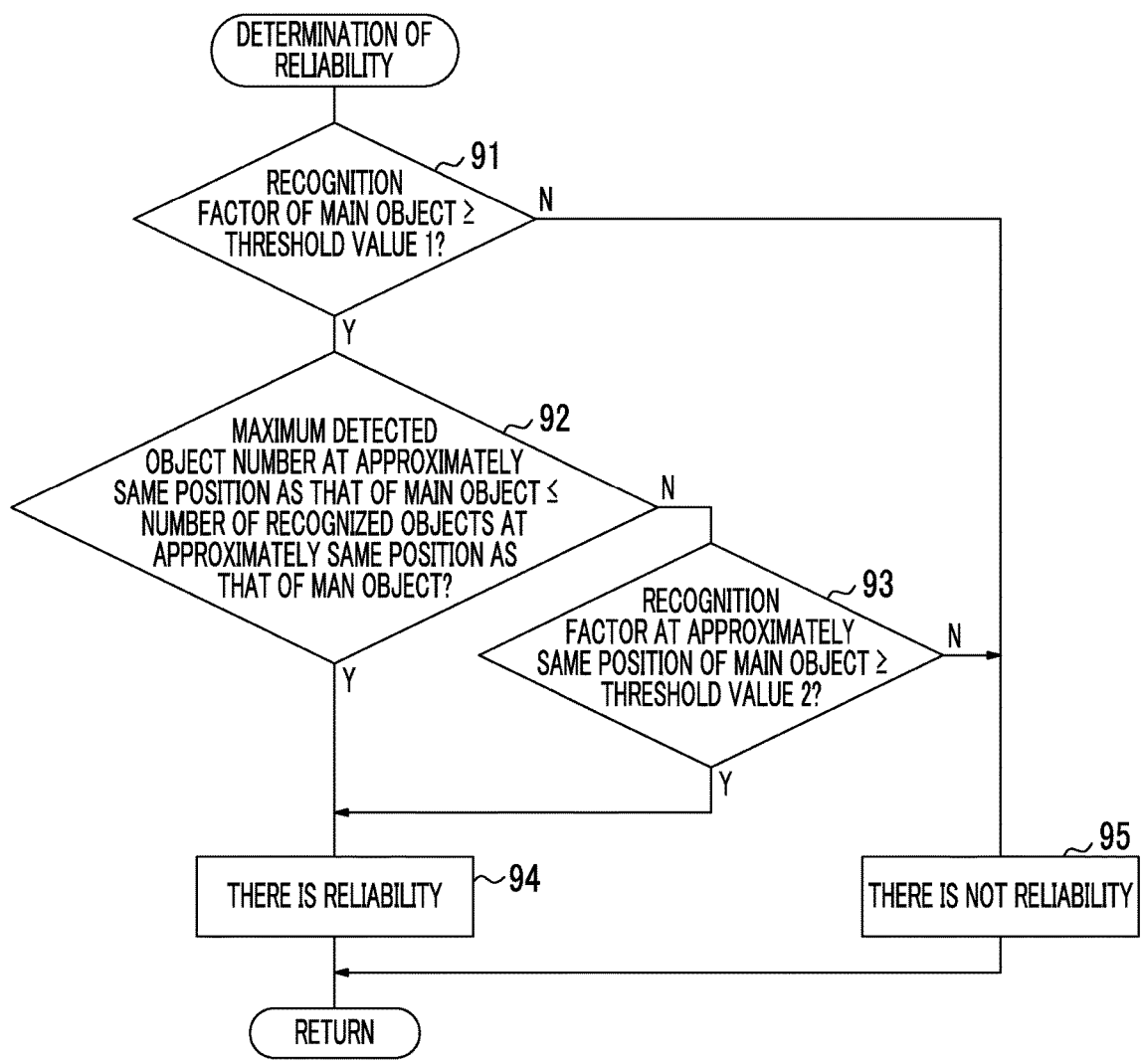
FIG. 23 is a flowchart illustrating a processing procedure of reliability determination.

FIG. 23 is a flowchart showing a processing procedure of a reliability determination process (a procedure of the process of step 82 in FIG. 20).

Referring to FIG. 21, it is determined whether a recognition factor for a main object is equal to or greater than a first threshold value (step 91). The recognition factor for the main object refers to a ratio of the number of camera apparatuses that recognizes a main object as the main object in a plurality of camera apparatuses, and is represented as (the number of camera apparatuses that recognizes a main object as the main object)/(the number of a plurality of camera apparatuses). In the example shown in FIG. 21, since the camera apparatus A and the camera apparatus B recognize the main object OE as the main object OE and the camera apparatus C recognizes the main object OE as the object OG, the recognition factor for the main object becomes ⅔.

In a case where the recognition factor for the main object OE is equal to or greater than the first threshold value (YES in step 91), a maximum detected object number, in each camera apparatus, of objects for which it is considered that the objects are present approximately at the same position as that of the main object OE (a maximum number such detected objects) is obtained. It is not essential that the maximum detected object number represents the number of objects that are recognized as specific objects, and it is sufficient if the number of objects recognized as objects can be known. The maximum detected object number represents the number of objects for which it is detected that the objects are present at the same position in each of the camera apparatus A, the camera apparatus B, and the camera apparatus C. For example, in each of the camera apparatus A, the camera apparatus B, and the camera apparatus C, since one object is detected at the position of (50, 70), the maximum detected object number becomes 1. Subsequently, the number of objects for which it is recognized that the objects are present at approximately the same position of that of the main object OE is detected. The number of the recognized objects represents the number of objects that are recognized as the main object OE among the objects that are present at approximately the same position as that of the main object OE. With respect to the main object that is present at the position of (50, 70), since the camera apparatus A and the camera apparatus B recognize the main object as the main object OE, and the camera apparatus C recognizes the main object as the main object OG, the number of the recognized objects becomes 2. It is determined whether the maximum detected object number detected in this way is equal to or smaller than the number of the recognized objects (step 92). In a case where the maximum detected object number is equal to or smaller than the number of the recognized objects (YES in step 92), since the number of camera apparatuses that determine that the main object is the main object is large, it is determined that there is a reliability (step 94).

In a case where the maximum detected object number is greater than the number of the recognized objects (NO in step 92), a recognition factor of the main object OE at the same position as the position where the main object OE is present is calculated. Since the camera apparatus A and the camera apparatus B recognize the main object as the main object OE and the camera apparatus C recognizes the main object as the object OG, the recognition factor becomes ⅔. In a case where the recognition factor is equal to or greater than a second threshold value (YES in step 93), it is determined that there is a reliability (step 94).

In a case where the recognition factor of the main object OE is smaller than the first threshold value (NO in step 91) or the recognition factor at approximately the same position as that of the main object is smaller than the second threshold value (NO in step 93), it is determined that there is no reliability (step 95).

In the above-described embodiment, the reliability for the main object OE is determined, but the reliability may be similarly determined by the control device 1 with respect to the other sub-object OC, or the like, as well as the main object OE.

Figure 24:
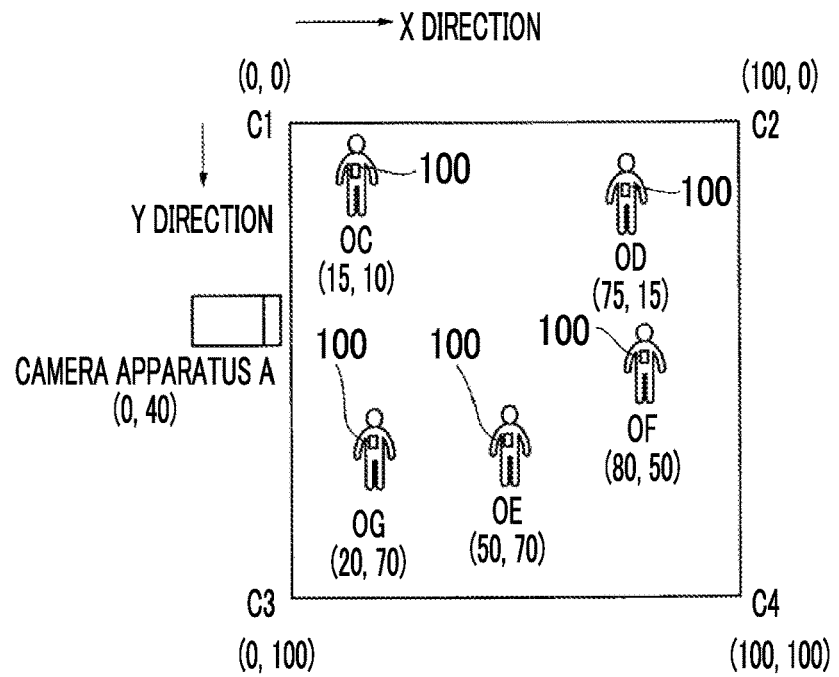
FIG. 24 is a diagram showing a movement region.
Figure 25:
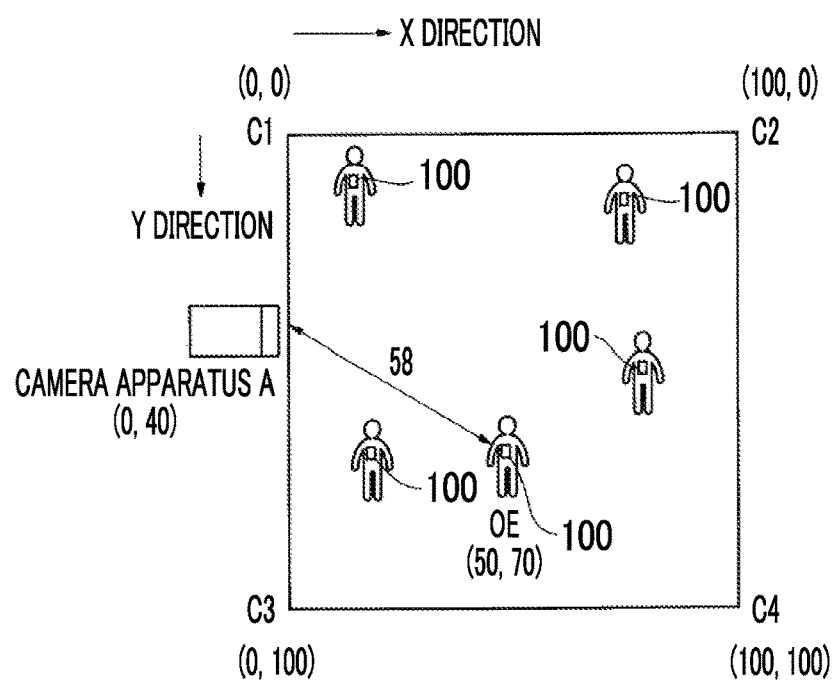
FIG. 25 is a diagram showing a movement region.

FIGS. 24 and 25 show a modification example.

It is assumed that the objects OC, OD, OE, OF, and OG are present at positions (15, 10), (75, 15), (50, 70), (80, 50), and (20, 70) in the movement region 40. A position detection device {a transmitter, a global positioning system device (GPS), or the like} 100 is provided in each of the objects OC, OD, OE, OF, and OG. An existing position is transmitted from the position detection device 100. Data indicating the position of each of the objects OC, OD, OE, OF, and OG and data for identifying the object at the position are transmitted from the position detection device 100 provided in each of the objects OC, OD, OE, OF, and OG, and are received in the communication device 3 (a position specification information reception unit) of the camera apparatus A. A distance (58 m) to the main object OE is calculated from the received data indicating the position and the received data for identifying the object in the camera apparatus A. In a case where the distance from the camera apparatus A to the main object OE is calculated in this way, a focusing target range is set at the front and back of the main object OE, and a movement range of the focus lens 7 of the camera apparatus A is limited.

Figure 26:
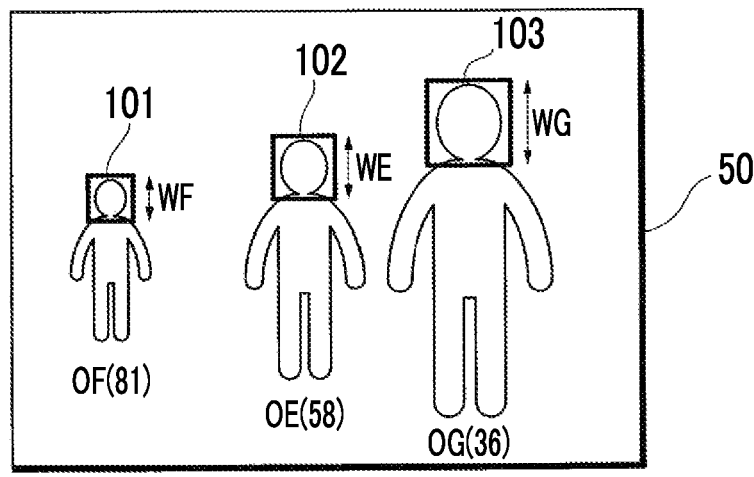
FIG. 26 is a diagram showing an example of a display screen.
Figure 27:
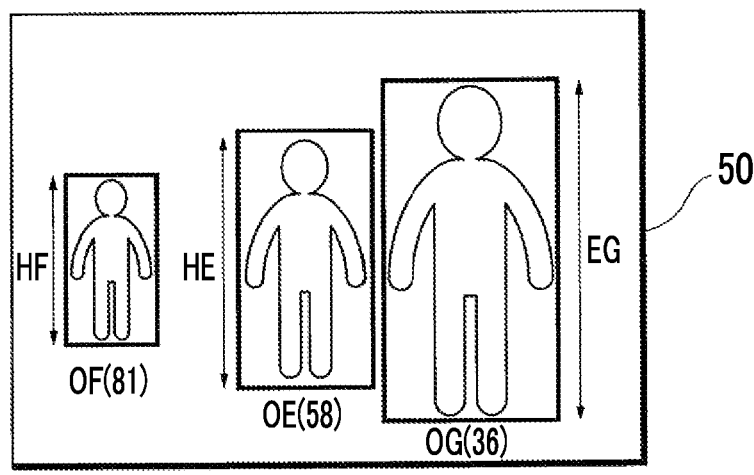
FIG. 27 is a diagram showing an example of a display screen.

FIGS. 26 and 27 are drawings showing a modification example, which show the display screen 50 of the display device 14. FIGS. 28 and 29 show a relationship between a face size or a height, and an object distance.

FIG. 26 is a diagram used in a case where object distances are calculated using face sizes of imaged objects.

It is assumed that the objects OE, OF, and OG are detected. Respective face regions 102, 101, and 103 are detected from the objects OE, OF, and OG by the control device 1 of the camera apparatus A. A distance to each of the objects OE, OF, and OG is calculated by the control device 1 from the size of the detected face (pixel number). In a case where the focal distance of the focus lens 7 is 100 mm, a table shown in FIG. 28 is used, and in a case where the focal distance of the focus lens 7 is 400 mm, a table shown in FIG. 29 is used. Tables corresponding to the focal distances of the focus lens 7 are stored, and object distances are calculated from the sizes of the detected face regions (pixel number) using the tables corresponding to the focal distances of the focus lens 7.

FIG. 27 is a diagram used in a case where the object distances are calculated using heights of imaged objects.

It is assumed that the objects OE, OF, and OG are detected. Respective heights HE, HF, and HG are detected by the control device 1 of the camera apparatus A from the respective objects OE, OF, and OG. Respective distances to the respective objects OE, OF, and OG are calculated by the control device 1 from the detected heights (pixel numbers). In a case where the focal distance of the focus lens 7 is 100 mm, a table shown in FIG. 28 is used, and in a case where the focal distance of the focus lens 7 is 400 mm, a table shown in FIG. 29 is used. Tables corresponding to the focal distances of the focus lens 7 are stored, and the distances to the objects are calculated from the detected heights (pixel numbers) using the tables corresponding to the focal distances of the focus lens 7.

The distances to the objects may be calculated using the lengths of feet, the lengths of trunks, the sizes of eyes, or the like, as well as the sizes of faces and heights. Further, in a case where the objects are humans, markers for size measurement are attached to the objects, and the distances to the objects may be calculated using the markers. In addition, in a case where the sizes of faces, heights, or the like are already known for the respective objects, tables may be changed or corrected to reflect the known sizes of faces, heights, or the like.

Figure 30:
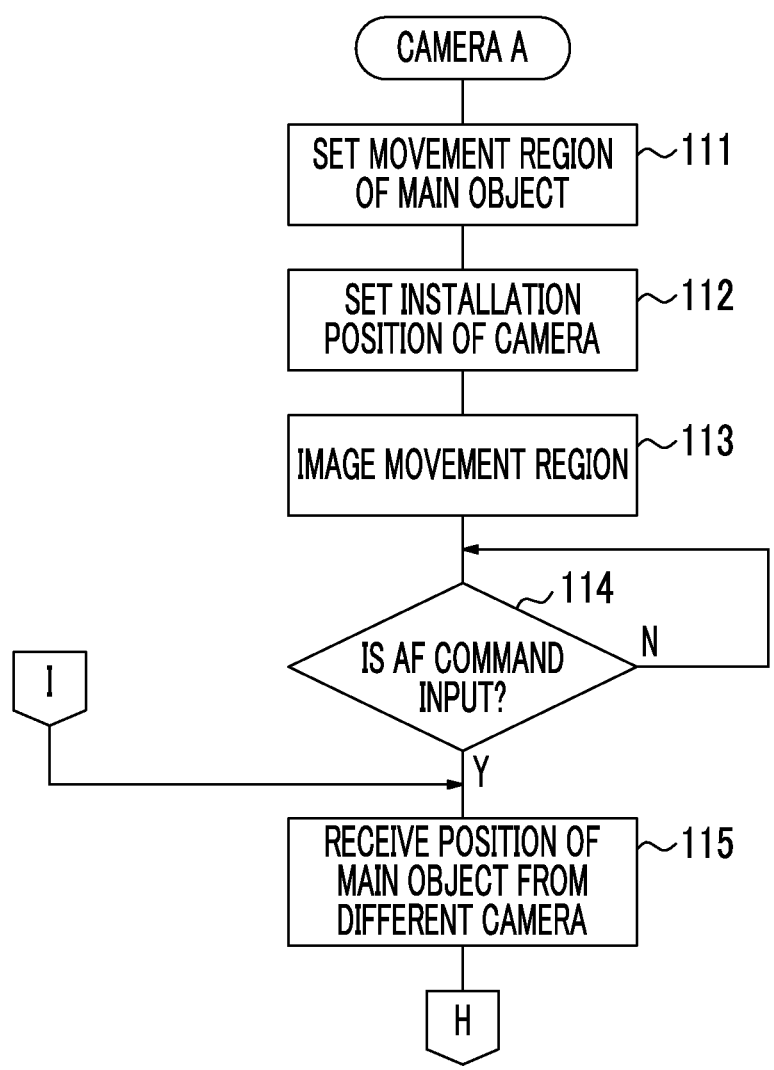
FIG. 30 is a flowchart illustrating a processing procedure of the camera apparatus.
Figure 31:
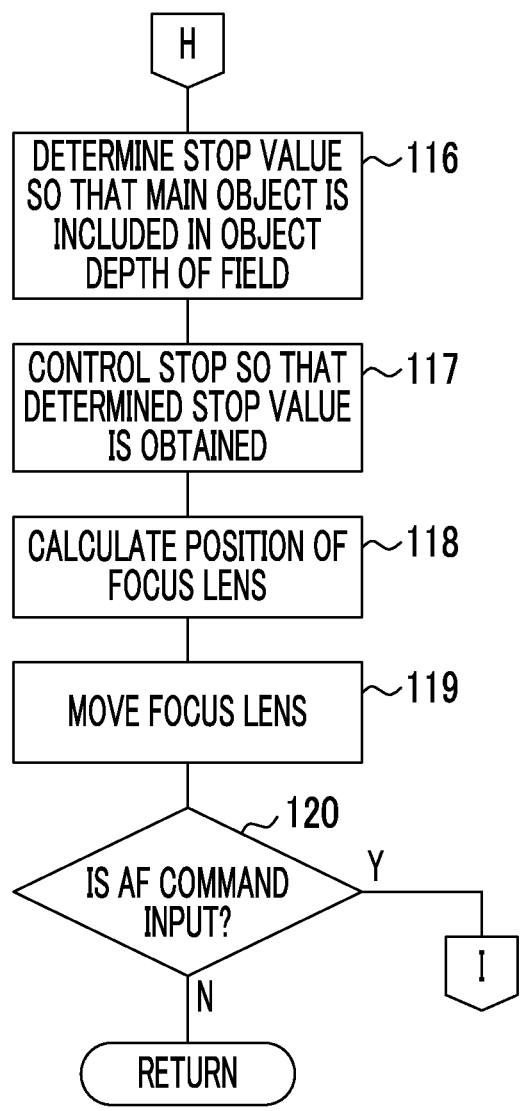
FIG. 31 is a flowchart illustrating a processing procedure of the camera apparatus.

FIGS. 30 and 31 are diagrams showing another embodiment, which are flowcharts illustrating a processing procedure of the camera apparatus A.

The movement region 40 of a main object is set (step 111), and an installation position of the camera apparatus A is set (step 112). The main object is recognized by the control device 1 of the camera apparatus A from a captured image. The movement region 40 is imaged by the camera apparatus A (step 113). In a case where an AF command is input through the AF command button 2 (step 114), data indicating the position of the main object and identification data of the main object are transmitted from a different camera apparatus, and the transmitted data indicating the position and the transmitted identification data of the main object are received in the camera apparatus A (step 115).

A stop value of the stop 4 is determined by the control device 1 so that the main object is included in an object depth of field of the camera apparatus A (step 116), and the stop motor 5 is controlled by the control device 1 (a stop control unit) so that the determined stop value is obtained (step 117).

The position of the focus lens 7 is calculated by the control device 1 so as to focus on an object at a position determined on the basis of the data indicating the position of the main object transmitted from the different camera apparatus (step 118), and the focus lens 7 is moved to the calculated position by the focus motor 8 (step 119). In a case where an AF command is input to the camera apparatus A, the process of step 115 and the subsequent processes are repeated again.

Even in a case where the camera apparatus A does not have an auto focus function, it is possible to focus on the main object. Further, even in a case where the camera apparatus A has the auto focus function, the stop value of the stop may be controlled so that the main object is included in the object depth of field as described above.

EXPLANATION OF REFERENCES

1: control device (a main object recognition unit, a focusing control unit, an imaging control unit, a first calculation unit, a detection unit, a distance calculation unit, a display control unit, a sub-object recognition unit, a remaining distance calculation unit, a position calculation unit, a mismatching calculation unit, a recognition control unit, a reliability calculation unit, and a stop control unit)
2: AF command button (an AF command input unit)
3: communication device (a position specification information acquisition unit, a first reception unit, a second reception unit)
8: focus motor (a focus unit)
10: CCD (an imaging unit)
14: display device
A: camera apparatus (an imaging apparatus)
B, C: camera apparatus (a first position detection imaging apparatus)

What is claimed is:

1. An imaging apparatus, connected to a first position detection image apparatus, comprising:
a position specification information acquisition unit that acquires position specification information for specifying the position of a main object in a real space;
an imaging unit that images an imaging range to obtain a captured image;
a main object recognition unit that recognizes the main object in the captured image obtained by the imaging unit;
a focusing control unit that sets a range defined at the front and back of the position specified by the position specification information acquired in the position specification information acquisition unit as a focusing target range in which imaging is performed in a state of focusing on an object that is present within the range to limit a movement of a focus lens;
a focus unit that drives the focus lens under the control of the focusing control unit;
an imaging control unit that focuses a main object image of the main object recognized by the main object recognition unit on a light receiving surface using the focus lens driven by the focus unit to cause the imaging unit to perform imaging;
wherein in a case where the main object is imaged by the first position detection imaging apparatus, first distance data indicating a distance from the first position detection imaging apparatus to the main object and first angle data indicating an angle formed by the first position detection imaging apparatus and the main object are transmitted by the first position detection imaging apparatus to the imaging apparatus; and
the position specification information acquisition unit includes a first reception unit that receives the first distance data and the first angle data transmitted by the first position detection imaging apparatus, and a first calculation unit that calculates the position specification information for specifying the position of the main object on the basis of the first distance data and the first angle data received by the first reception unit.

2. The imaging apparatus according to claim 1, wherein the focusing target range becomes wider as an object depth of field of the imaging means becomes deeper.

3. The imaging apparatus according to claim 1, further comprising:
a detection unit that detects the amount of movement of the main object,
wherein in a case where the amount of movement detected by the detection unit is equal to or greater than a threshold value, the focusing target range is widened.

4. The imaging apparatus according to claim 1, wherein in a case where the main object is imaged by a second position detection imaging apparatus, second distance data indicating a distance from the second position detection imaging apparatus to the main object and second angle data indicating an angle formed by the second position detection imaging apparatus and the main object are transmitted by the second position detection imaging apparatus,
the first reception unit receives the first distance data and the first angle data transmitted by the first position detection imaging apparatus and the second distance data and the second angle data transmitted by the second position detection imaging apparatus, and
the first calculation unit calculates the position specification information for specifying the position of the main object on the basis of at least one of a set of the first distance data and the first angle data received by the first reception unit or a set of the second distance data and the second angle data received by the first reception unit.

5. The imaging apparatus according to claim 1, wherein the position of the main object is detected by a position detection device, and the position specification information indicating the position of the main object is transmitted by the position detection device, and the position specification information acquisition unit includes second reception unit that receives the position specification information transmitted by the position detection device.

6. The imaging apparatus according to claim 1, wherein the focus unit sets, in a case where the main object is recognized by the main object recognition unit, an AF area including the recognized main object, sets a predetermined area as the AF area in a case where the main object is not recognized by the main object recognition unit, and drives the focus lens to focus on an object that is present in the set AF area.

7. The imaging apparatus according to claim 1, wherein the focus unit sets, in a case where the main object is recognized by the main object recognition unit, an AF area including the recognized main object, sets an AF area on the basis of a position specified by the position specification information acquired in the position specification information acquisition unit in a case where the main object is not recognized by the main object recognition unit, and drives the focus lens to focus on an object that is present in the set AF area.

8. The imaging apparatus according to claim 1, wherein a distance to the main object is calculated on the basis of a phase difference of the main object imaged by the first position detection imaging apparatus.

9. The imaging apparatus according to claim 1, further comprising:
an AF command input unit that inputs an AF command; and
a main object determination unit that determines an object included in an AF area defined in the captured image obtained by the imaging unit as the main object as the AF command is input through the AF command input unit,
wherein the position specification information acquisition unit acquires the position specification information for specifying the position of the main object determined by the main object determination unit in the real space.

10. The imaging apparatus according to claim 1, further comprising:
a display device that displays the captured image obtained by the imaging unit on a display screen;
a distance calculation unit that calculates a distance to the main object; and
a display control unit that displays the distance calculated by the distance calculation unit on the display screen in association with the main object.

11. The imaging apparatus according to claim 10, wherein the position specification information acquired in the position specification information acquisition unit specifies the position of each of the main object and a sub-object in the real space,
the imaging apparatus further comprises a sub-object recognition unit for recognizing a sub-object from the captured image obtained by the imaging unit,
the distance calculation unit calculates a distance to the main object or a distance to the sub-object, and the display control unit displays the distance calculated by the distance calculation unit on the display screen in association with the main object or the sub-object corresponding to the distance.

12. The imaging apparatus according to claim 10, further comprising:
a remaining distance calculation unit that calculates a remaining distance between the distance to the main object calculated by the distance calculation unit and a distance to a position that is focused by the focus lens,
wherein the display control unit displays the remaining distance calculated by the remaining distance calculation unit on the display screen in association with the main object.

13. The imaging apparatus according to claim 12, wherein the position specification information acquired in the position specification information acquisition unit specifies the position of each of the main object and a sub-object in the real space,
the imaging apparatus further comprises a sub-object recognition unit that recognizes a sub-object from the captured image obtained by the imaging unit,
the distance calculation unit calculates a distance to the main object and a distance to the sub-object,
the imaging apparatus further comprises remaining distance calculation unit for calculating a remaining distance between the distance to the main object calculated by the distance calculation unit and a distance to a position that is focused by the focus lens and a remaining distance between the distance to the sub-object calculated by the distance calculation unit and a distance to a position that is focused by the focus lens, and
the display control unit displays the remaining distance calculated by the remaining distance calculation unit on the display screen in association with the main object or the sub-object corresponding to the remaining distance.

14. The imaging apparatus according to claim 1, further comprising:
a position calculation unit that calculates the position, in the real space, of the main object recognized by the main object recognition unit;
a mismatch determination unit that determines whether there is mismatching between the position calculated by the position calculation unit and the position, in the real space, of the main object specified by the position specification information acquired by the position specification information acquisition unit; and
a recognition control unit that performs the recognition of the main object in the main object recognition unit again in a case where it is determined by the mismatch determination unit that there is the mismatching.

15. The imaging apparatus according to claim 14, wherein the position specification information acquisition unit acquires a plurality of pieces of position specification information,
the imaging apparatus further comprises a reliability calculation unit that calculates a reliability of the recognition of the main object performed by the recognition control unit on the basis of a plurality of positions, in the real space, of the main object specified by the plurality of pieces of position specification information and positions calculated by the position calculation unit, and
the focus unit drives the focus lens while limiting the movement thereof in a case where the reliability calculated by the reliability calculation unit is equal to or greater than a threshold value.

16. The imaging apparatus according to claim 1, further comprising:
a sub-object recognition unit that recognizes a sub-object from the captured image obtained by the imaging means; and
a position calculation unit that calculates the positions, in the real space, of the main object recognized by the main object recognition unit and the sub-object recognized by the sub-object recognition unit,
wherein the position specification information acquired by the position specification information acquisition unit specifies the position, in the real space, of each of the main object and the sub-object, and
the imaging apparatus further comprises:
a mismatch determination unit that determines whether there is mismatching between the positions calculated by the position calculation unit and the positions represented by the position specification information acquired by the position specification information acquisition unit; and
a recognition control unit that performs the recognition process in at least one of the main object recognition unit or the sub-object recognition unit again with respect to at least one of the main object or the sub-object present at a position for which it is determined by the mismatch determination unit that there is the mismatching.

17. The imaging apparatus according to claim 1,
wherein the position specification information acquisition unit receives position specification information transmitted from a position detection device provided in the main object.

18. The imaging apparatus according to claim 1,
wherein the distance to the main object is calculated from the size of the main object imaged by the first position detection imaging apparatus or the size of the face of the main object and a focal distance of the first position detection imaging apparatus.

19. The imaging apparatus according to claim 1, further comprising:
a stop control unit that controls a stop into such a stop value that the main object that is present at the position specified by the position specification information acquisition means is included in an object depth of field of the imaging means; and
wherein the imaging control unit focuses the main object image of the main object recognized by the main object recognition unit on the light receiving surface using the focus lens driven by the focus unit and the stop value controlled by the stop control unit to cause the imaging unit to perform imaging of the main object.

20. An imaging method comprising:
acquiring position specification information for specifying the position of a main object in a real space, using a position specification information acquisition unit of an imaging apparatus connected to a first position detection imaging apparatus;
imaging an imaging range to obtain a captured image, using an imaging unit of the imaging apparatus;
recognizing the main object from the captured image obtained by the imaging unit, using a main object recognition unit of the imaging apparatus;
setting a range defined at the front and back of the position specified by the position specification information acquired in the position specification information acquisition unit as a focusing target range in which imaging is performed in a state of focusing on an object that is present within the range to limit a movement of a focus lens, using a focusing control unit of the imaging apparatus;
driving the focus lens under the control of the focusing control unit, using a focus unit of the imaging apparatus;
focusing a main object image of the main object recognized by the main object recognition unit on a light receiving surface using the focus lens driven by the focus unit to cause the imaging unit to perform imaging, using an imaging control unit of the imaging apparatus;
transmitting by the first position detection imaging apparatus, in a case where the main object is imaged by the first position detection imaging apparatus, first distance data indicating a distance from the first position detection imaging apparatus to the main object and first angle data indicating an angle formed by the first position detection imaging apparatus and the main object;
receiving, by a first reception unit of the position specification information acquisition unit, the first distance data and the first angle data transmitted by the first position detection imaging apparatus to the imaging apparatus; and
calculating, by a first calculating unit of the position specification information acquisition unit, the position specification information for specifying the position of the main object on the basis of the first distance data and the first angle data received by the first reception unit.

21. The imaging method according to claim 20, further comprising:
controlling a stop into such a stop value that the main object that is present at the position specified by the position specification information acquisition unit is included in an object depth of field of the imaging unit, using stop control unit; and
causing the imaging unit to image the main object using the stop control by the stop control unit, using imaging control unit.

* * * * *